United States Patent [19]

Ando

[11] Patent Number: 4,768,088
[45] Date of Patent: Aug. 30, 1988

[54] APPARATUS FOR COMMANDING ENERGIZATION OF ELECTRICAL DEVICE

[75] Inventor: Mitsuhiro Ando, Tokyo, Japan

[73] Assignee: Aisin Seiki Kabushikikaisha, Aichi, Japan

[21] Appl. No.: 937,154

[22] Filed: Dec. 2, 1986

[30] Foreign Application Priority Data

Dec. 4, 1985 [JP] Japan ............................ 60-272793

[51] Int. Cl.$^4$ .................... H04N 7/18; H04N 7/00
[52] U.S. Cl. ................................. 358/93; 358/103; 351/210; 364/550; 901/47
[58] Field of Search ............... 340/365 R; 358/83, 93, 358/94, 103; 351/210; 180/316; 901/47; 364/550

[56] References Cited

U.S. PATENT DOCUMENTS

| | | | |
|---|---|---|---|
| 4,028,725 | 6/1977 | Lewis | 358/103 |
| 4,034,401 | 7/1977 | Mann | 351/210 |
| 4,281,342 | 7/1981 | Ueda et al. | 901/47 |
| 4,340,878 | 7/1982 | Spooner et al. | 358/103 |
| 4,397,531 | 8/1983 | Lees | 351/210 |
| 4,648,052 | 3/1987 | Friedman et al. | 351/210 |
| 4,688,037 | 8/1987 | Krieg | 340/365 R |

Primary Examiner—James J. Groody
Assistant Examiner—John K. Peng
Attorney, Agent, or Firm—Sughrue, Mion, Zinn, Macpeak & Seas

[57] ABSTRACT

An apparatus controls an on/off condition of an electrical device or devices mounted on an automobile, such as a car radio set, an air conditioner, a cigar lighter or the like. The face of a driver who is mounted on the vehicle is photographed by a television camera, which produces a video signal that is subject to a digital processing operation for storage in a frame memory. A video signal processing system essentially comprising CPU, RAM and ROM is operative, based upon the video data stored in the frame memory, to detect the pupil and mouth of the driver as well as their locations and configurations. A change in the location of the pupil as well as a change in the configuration of the pupil and the mouth is detected as a time sequence, and an on/off command signal is supplied to an electrical device in accordance with such changes.

13 Claims, 17 Drawing Sheets

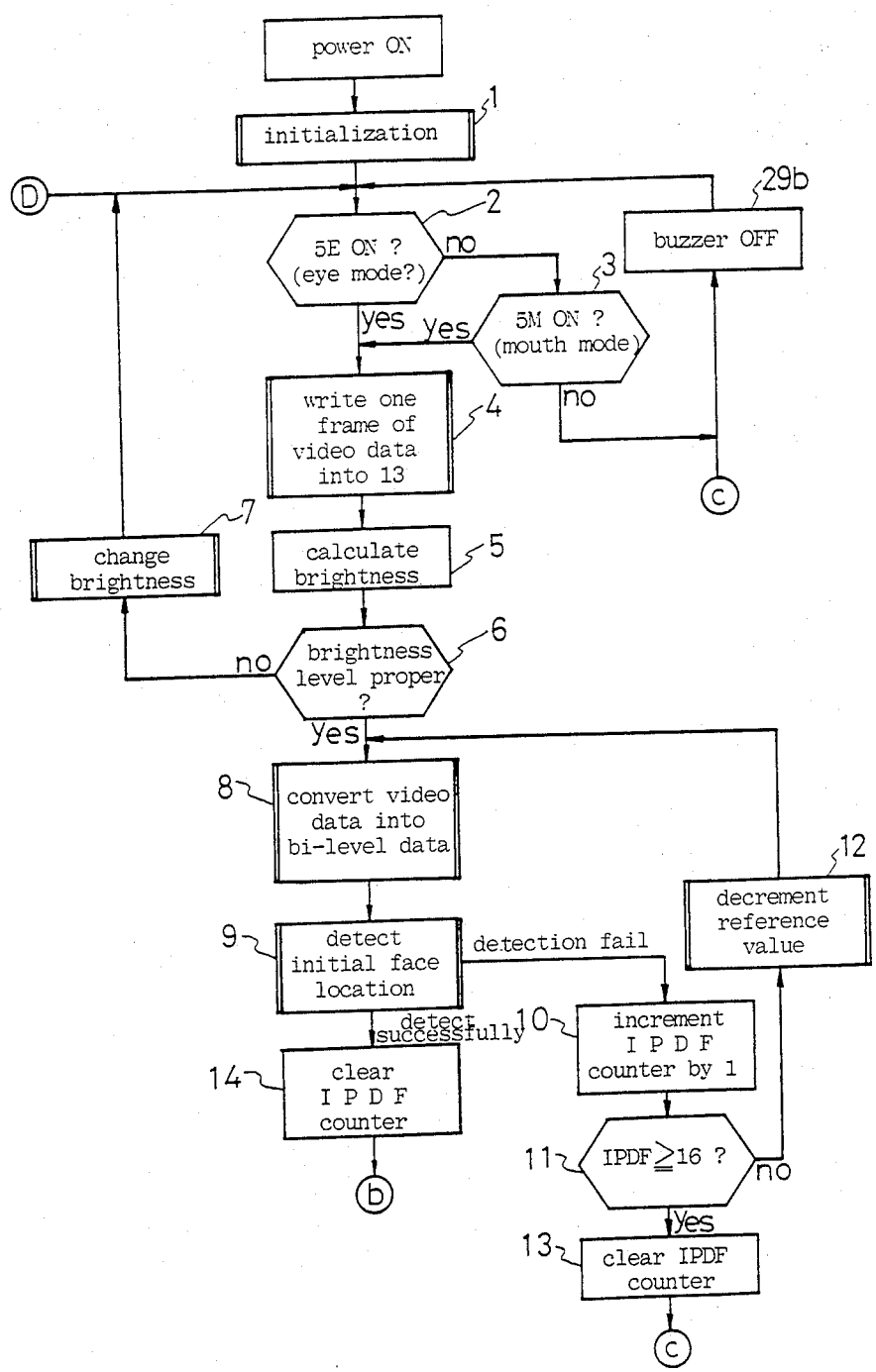

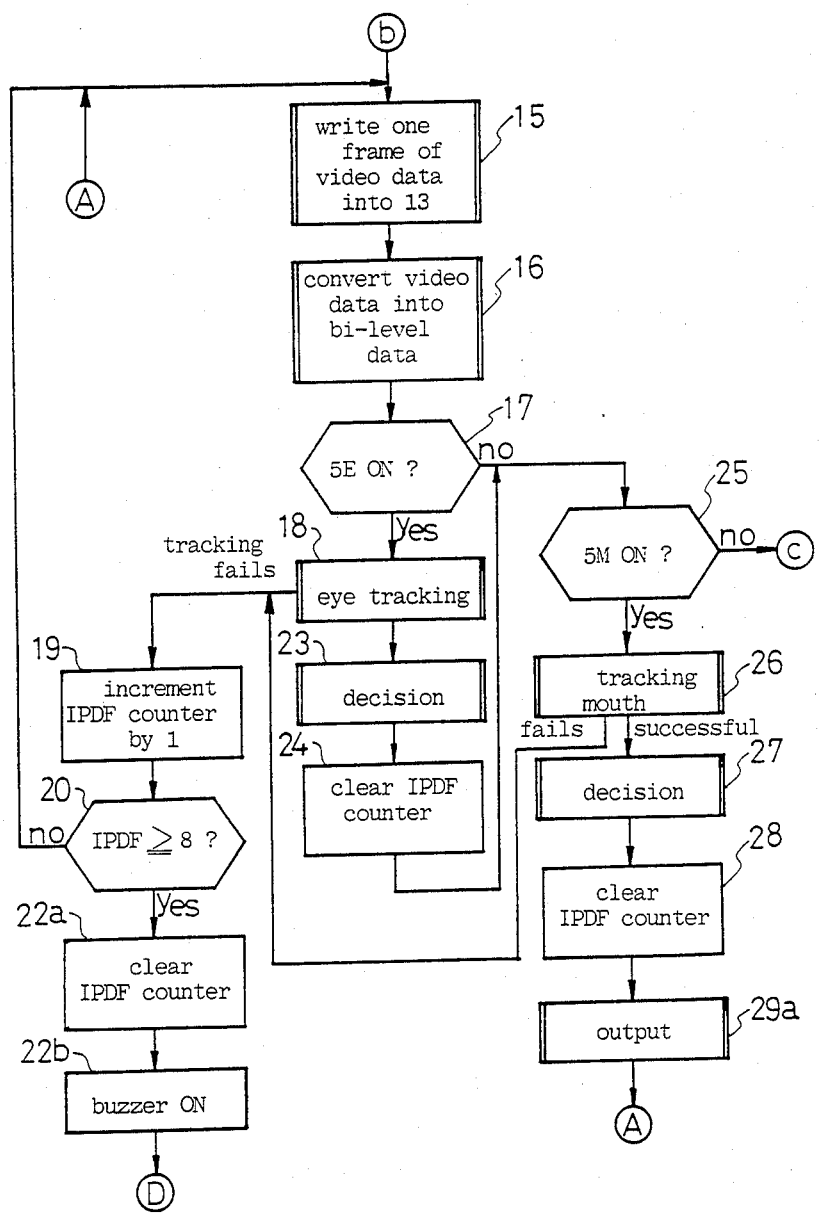

right eye region E $cx = (ecx1 + ecx2)$

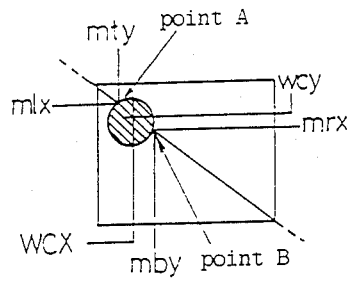
Fig.5e
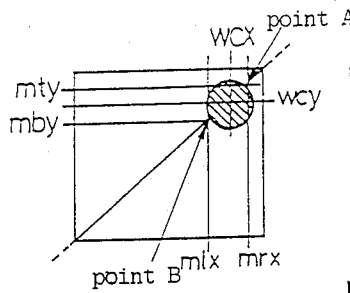
Fig.5f
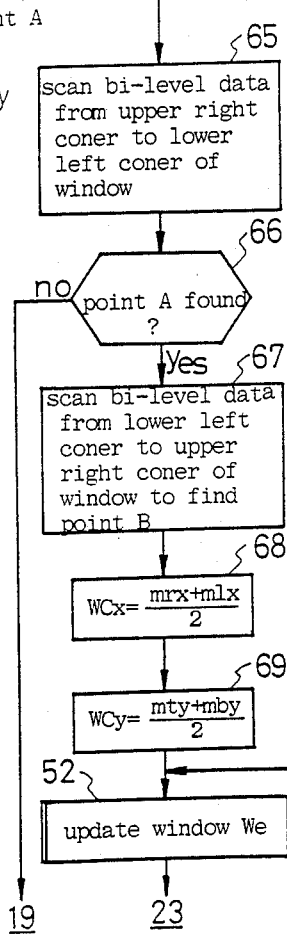
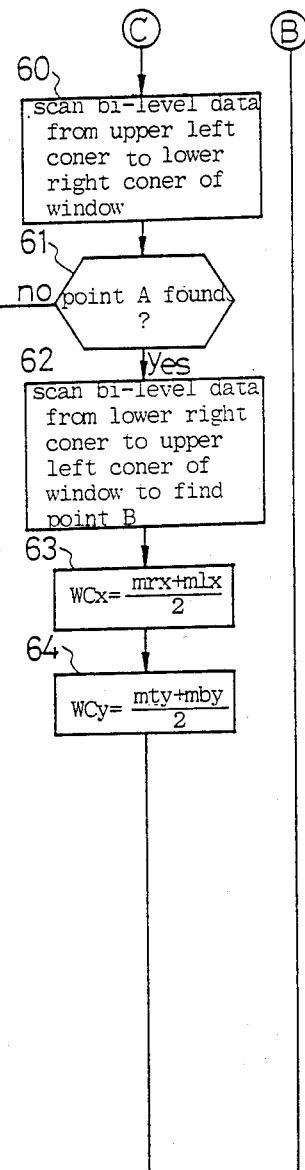
Fig.3d

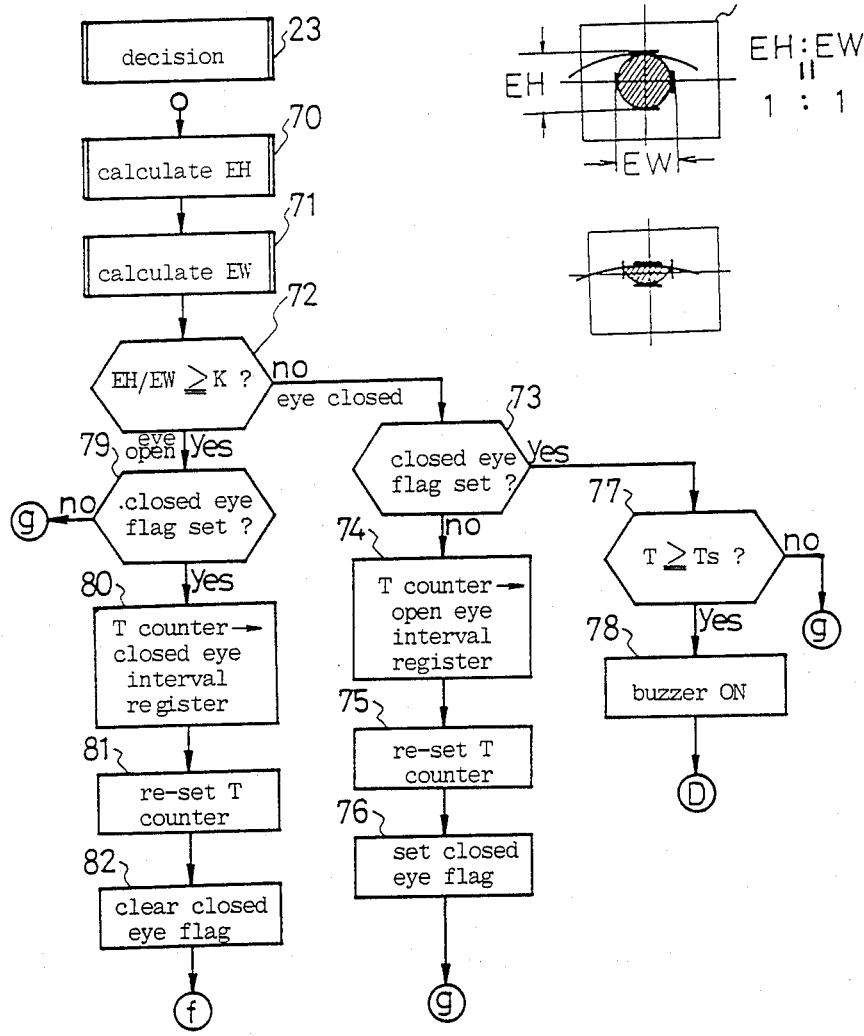

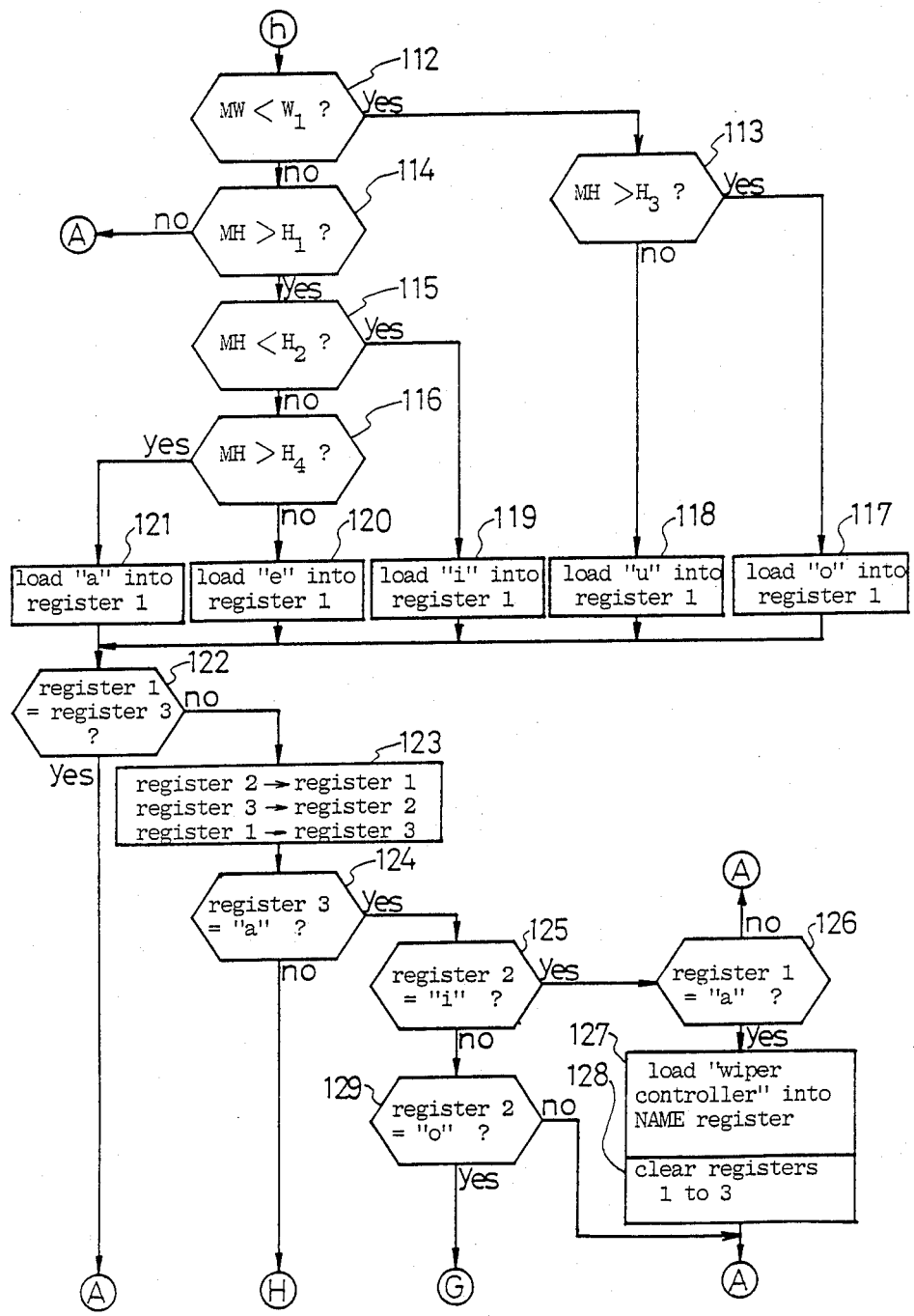

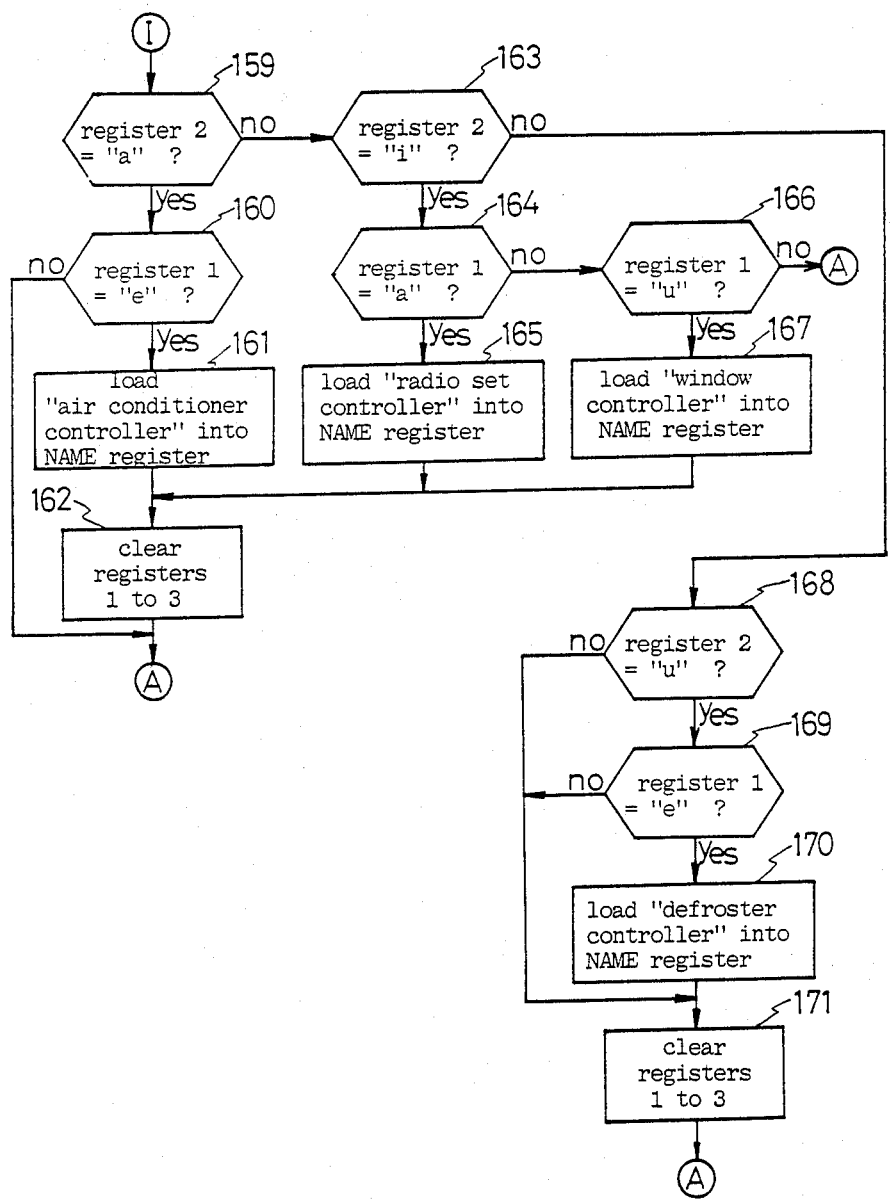

APPARATUS FOR COMMANDING ENERGIZATION OF ELECTRICAL DEVICE

FIELD OF THE INVENTION

The invention relates to an apparatus for commanding energization of an electrical device as by applying a control signal thereto which turns it on and off or which corresponds to an up or down output. In particular, the invention relates to an automatic controlling apparatus which provides a command to operate an electrical device in response to an automatic detection of an operation of an object, such as by providing a command signal to energize an electrical device in response to the motion or operation of an object including a man, for example, in a non-contact manner.

BACKGROUND OF THE INVENTION

The prior art of the kind described includes an automatic door, an abnormality (advancement or ingress) alarm, a metal detector or the like which incorporate photo-sensors, a depressed plate or the like. All of these utilize either non-contact sensors or mechanical switches such as photo-sensors, microswitches, electrostatic proximity switches and electromagnetic sensors, which are operable to detect an opening or closing of an electrical contact, an interception or opening for a radio wave path, a change in the electric or magnetic field or the like which is attributable to the contact by or proximity or passage of an object or a man, thus turning an electrical device on and off, which may include a buzzer, a meter, an automatic door, a relay, a monitor television set or electromechanical controlling device.

With these arrangements, an on/off control of an electrical device cannot be achieved unless an object or a man undergoes a relatively large movement at a close distance thereof relative to a sensor. Since a sensor is incapable of detecting a change in the status of a very small part of an object or a man, it is a usual practice in the prior art to provide an entry unit which essentially comprises a key switch, in an apparatus which energizes various electrical devices. By way of example, a road vehicle is provided with various electrical devices associated with corresponding key switches, volume controls. However, it is dangerous that a driver stretches out his arm or twists his body in order to operate the switch or volume control durig the time he is driving the vehicle. In addition, a delicate operation of such switch or volume control involves difficulty since the driver cannot divert his eyes away from the forward direction and to attend to these controls carefully over a relatively long period of time. Accordingly, it is contemplated that a voice recognition apparatus be provided to control various electrical devices in response to the recognition of a voice given off by the driver. However, this arrangement is susceptible to an erroneous recognition in view of noises which prevail within the vehicle.

SUMMARY OF THE INVENTION

It is a first object of the invention to provide an automatic control of the energization of various electrical devices in response to a change in the status of a relatively small area within a relatively broad region. It is a second object to provide an automatic control of the energization of various electrical devices in a relatively accurate and non-contact manner without requiring any significant attention and operation on the part of a man.

The above objects are accomplished in accordance with the invention by utilizing an image pattern recognition technique. Specifically, camera means which converts optical information from an image into an electrical signal as well as image signal processing means which detects the location of a particular area within the image on the basis of the electrical signal are provided. An object or a man (which is hereafter assumed to be a vehicle driver) is observed by the camera means, and the location of a particular area such as the pupil or mouth in the face of the driver (which is chosen as the particular area to be detected within the image) is detected.

To accommodate for variation in the brightness which prevails within the vehicle, in a preferred embodiment of the invention, illumination means which illuminates the image is associated with brightness level adjusting means, which is controlled by the image signal processing means operating to detect the brightness level of the image to provide any required command to change the brightness level established by the brightness level adjusting means, thus maintaining a constant brightness level of the image area or driver's face and thus preventing any resulting error in the processing of image which would be caused by a variation in the brightness level.

To enable information representing the location of eye(s) and mouth to be accurately derived from camera information in a manner following a change in the location of eye(s) and mouth produced by an intended movement thereof to achieve an automatic control of energization of electrical devices and also following a change in the location of the face which may be caused by an unintended movement through a reduced stroke or a change in the attitude of the driver as well as oscilations of the vehicle, the image signal processing means includes memory means which stores the detected location. A region which is less in size than that of the image field or a window is selected on the basis of the stored location. At a given time interval after the storage, an area to be detected is chosen within the window region, and a particular area within the window is detected to update the memory means. The window region is also updated to a location which corresponds to the detected location of the particular area. In this manner, once the location of the eye(s) and mouth (particular area) is detected, the required range of information scanning to detect the eye(s) and mouth in the image field is restricted to a smaller region, thus reducing the length of time required for the detection and also increasing the accuracy of detection. In this maner, the eye(s) and mouth can be rapidly and accurately tracked.

In accordance with the invention, the image signal processing means also detects a change in the status of the eye(s) and mouth as a time sequence, supplying an energization controlling signal to an electrical device to be controlled which corresponds to such change in the status, through output means. Thus, when a given change in the status of the eye(s) and mouth being tracked occurs, indicating an intended change which is to control the energization of an electrical device, an energization control signal which corresponds to such change is applied to the electrical device.

With the described arrangement, the driver of the vehicle is capable of controlling an electrical device by merely moving his eye(s) or mouth while maintaining the driving position of the vehicle intact, thus greatly simplifying the operation of vehicle mounted devices while maintaining a comfortable and safe driving operation. If the driver has given off any voice, the electrical device will be controlled in a manner corresponding to the configuration of the mouth. If the driver does not give off a voice, but intentionally forms his mouth to the same configuration as assumed when a voice is given off, the electrical device is also controlled in a manner corresponding to the configuration of the mouth. Since the apparatus does not rely upon voice, it is free from any error which is attributable to noises within the vehicle. If an onboard radio set is on or if co-occupant of the vehicle speaks aloud, the apparatus cannot respond thereto to cause a wrong operation.

It will be appreciated that the described operation can be achieved when an object being observed by the camera means is not a driver of a vehicle. By way of example, a patient with advanced disease in a hospital could operate or cease to operate a medical instrument or medical aid or increase or decrease the power level thereof with his eye(s) and mouth.

Alternatively, a particular part of a machine may be chosen as a particular area which is to be observed by the camera means. Any abnormal movement of such part may be monitored to stop the operation of the machine or to activate an alarm, thus utilizing the apparatus of the invention as an abnormality monitoring and protective apparatus for a machine. In this manner, the invention is equally applicable with an object other than a man with similar effect.

As a further alternative, the invention can be similarly implemented with an object being monitored which is chosen as an extensive space or the background of the nature with a moving body such as an animal or vehicle in that the space being chosen as a particular area. For example, a gate or gates can be opened or closed in accordance with the movement of a vehicle or the movement of a wild beast within a safari park. Similarly, such space may be replaced by a factory where an object being observed may be chosen as a belt conveyor line, for example, so that when a part or product on the conveyor, then functioning as a particular area, moves in a given direction, a safety unit may be activated or an instrument of the next following step may be operated, with similar effects as mentioned above.

Above and other objects, features and advantages of the invention will become apparent from the following description of an embodiment thereof with reference to the drawings.

BRIEF DESCRIPTION OF THE DRAWINGS

FIG. 1c is a perspective view illustrating the layout of a camera and an illumination lamp shown in FIG. 1a;

FIGS. 2a and 2b are flowcharts illustrating a control operation by a microprocessor shown in FIG. 1a;

FIGS. 3a, 3b, 3c, 3d, 3e, 3f, 3g, 3h, 3i, 3j, 3k and 3l are flowcharts showing the detail of control operations by the microprocessor;

FIGS. 5a, 5b, 5c, 5d, 5e, 5f and 5g are schematic views illustrating a window region which is used in tracking the movement of the pupil and a pupil detected therein;

DESCRIPTION OF PREFERRED EMBODIMENT

Figure 1A:
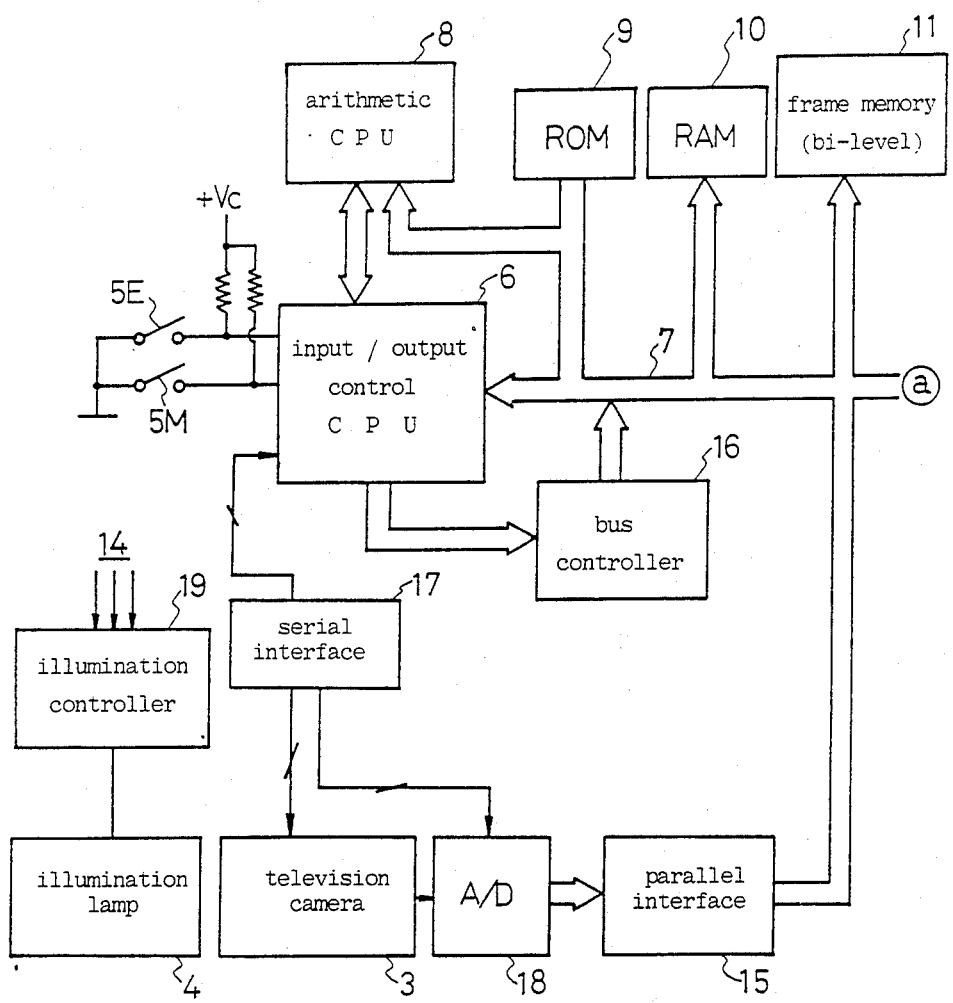
FIGS. 1a and 1b are block diagrams, which are combined by joining (a) in both Figures, of an embodiment of the invention.
Figure 1B:
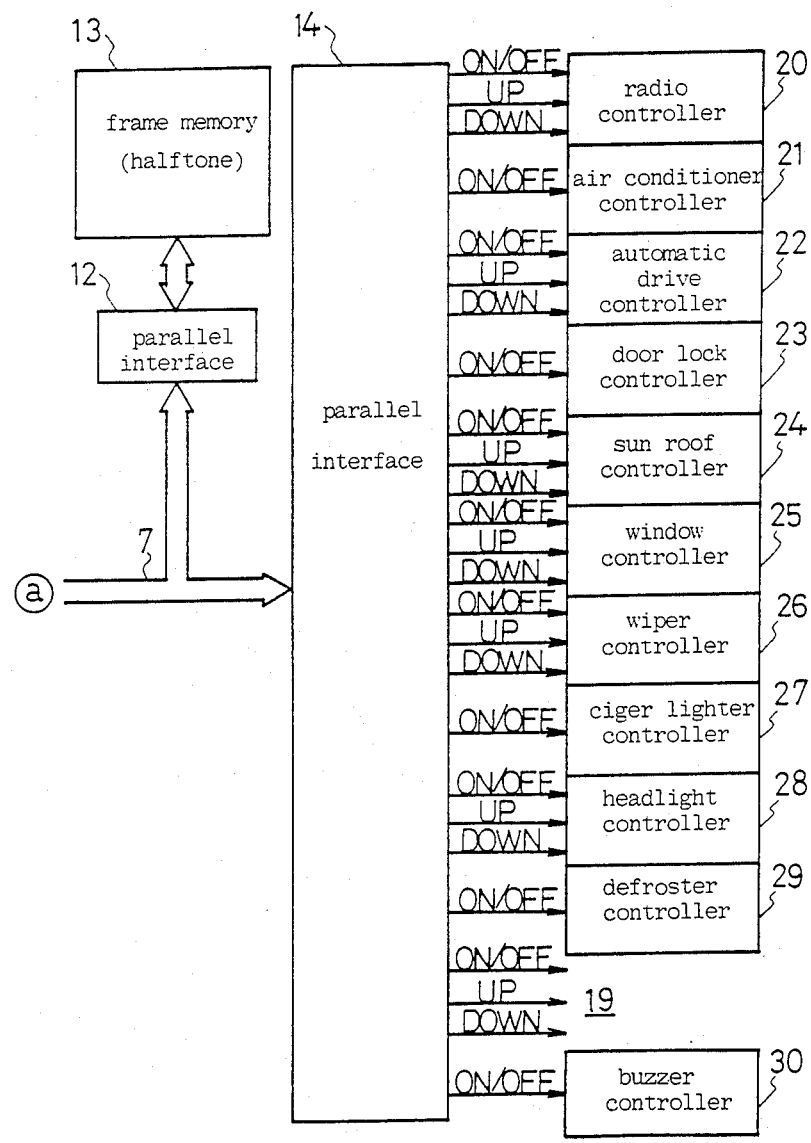

Referring to FIGS. 1a and 1b which show a preferred embodiment of the invention, there is shown an onboard controlling apparatus which automatically controls turn-on/-off and up/down operation of a vehicle mounted electrical device in response to an intended movement of eyes and a mouth in a driver's face.

Figure 1C:
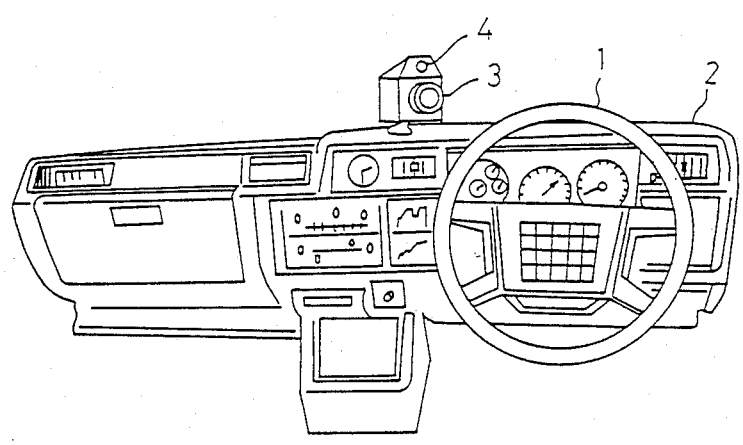

Referring to FIG. 1c, a television camera 3 and an illumination lamp 4 which illuminates at least the face of a driver are constructed as an integral unit which is fixedly mounted with respect to an instrument panel 2 so as to be adjustable in their orientation in both vertical and lateral directions. In FIG. 1c, numeral 1 indicates a steering wheel operated by a driver for controlling the steering direction of a vehicle.

Referring to FIG. 1a, the energization of the lamp 4 is controlled by an illumination controller 19, which also controls the brightness level produced by the lamp. The lamp 4 comprises an incandescent bulb including a filament for its use as a source of illumination. The illumination controller 19 is designed as a thyristor chopper operating on a d.c. voltage so as to feed the lamp 4. The controller 19 turns the thyristor chopper off in response to an off condition of an energization signal. When the energization signal is on, the controller initially turns the chopper on and off with a standard duty cycle, and subsequently updates the duty cycle one step higher when an energization signal is oncoming which indicates an increase in the brightness level (up), and also updates the duty cycle by one step lower when an energization signal is oncoming which indicates a decrease in the brightness level (down). When the brightness level reaches either limit, the duty cycle ceases to be changed. The illumination controller 19 receives an on/off command signal and an up/down command signal from a microprocessor 6 through an interface 14.

The television camera 3 comprises a two dimension array of CCD elements which provides an analog video signal comprising 256×256 picture elements per frame. The camera 3 receives an on/off signal from the microprocessor 6 through an interface 17. The camera 3 repeatedly delivers one frame of 256×256 picture elements to A/D converter 18 and also feeds a picture element sync pulse thereto as an A/D conversion sync pulse while delivering a frame sync pulse, a line sync pulse and a picture element sync pulse to the microprocessor 6 through the interface 17. When reading one frame of video data, the microprocessor 6 provides a write command to a frame memory (RAM) 13 (see FIG. 1b) in synchronism with the frame sync pulse, incrementing the write address of the frame memory 13 in synchronism with the line sync pulse and the picture element sync pulse. In the present embodiment, the converter 18 converts the video signal into a 4 bit digital data corresponding 16 halftone levels. Thus, the video data which is written into the frame memory 13 comprises four bits per picture element.

Mode switches 5E and 5M are connected to the microprocessor 6. The purpose of the switch 5E is to select an eye responsive mode, and when it is closed, the microprocessor 6 operates to control the energization of electrical devices 20, 21, 29 and 30, which will be described later, in accordance with the location of an eye (or more exactly, the pupil therein) and its blinking pattern. The purpose of the switch 5M is to establish a mouth responsive mode, and when it is closed, the microprocessor 6 controls the energization of the electrical devices 20 to 30 in accordance with a pattern in which the configuration of a mouth is changed.

The microprocessor 6 is connected to another microprocessor 8 which essentially performs various arithmetic operations used for rendering various decisions. In addition, a one frame memory (RAM) 11 which is used as a temporary memory of bi-level data for one frame, each of which comprises a single bit per picture element to indicate the presence or absence of a black in the picture, ROM 9 and RAM 10 which are similar to those used in the control of a computer system, and a bus controller 16 are connected to the microprocessor 6, in addition to the frame memory 13 mentioned above. As mentioned previously, the electrical devices 20 to 30 which are to be controlled and the illumination controller 19 are connected with the microprocessor 6.

Referring to FIG. 1b, individual electrical devices to be controlled will now be described more specifically. A radio controller 20 is designed to control turn-on/off of a power supply as well as an incremental up/down volume control of a radio set. Specifically, when an energization signal is on, the power supply to the radio set is turned on while the latter is turned off in response to an off condition of the energization signal. Each time an energization signal demanding an increase in the volume (up) is oncoming, the volume control is incremented by one step while each time an energization signal demanding a decrease in the volume level (down) is oncoming, the volume control is incrementally reduced by one step. When the volume reaches either limit, the controller ceases to increase or decrease the volume level any further.

An air conditioner controller 21 only controls turn-on/off of an air conditioner. The selection of heating-/cooling, power level change and turn-on/off of a cleaner, which depend on the room temperature and the contamination of the air, are left to a controller (not shown) which is housed within the air conditioner itself.

An automatic drive (automatically causing the vehicle to run at a given speed) controller 22 only controls the turn-on/off of an automatic drive unit. As is well known, an automatic drive unit responds to an automatic drive command by storing the prevailing running speed of the vehicle, controlling a throttle opening subsequently so that the vehicle speed is maintained at the stored speed, and ceasing the control over the throttle opening whenever the automatic drive command has been removed. Alternatively, an automatic drive unit may responds to an automatic drive command by controlling a throttle opening so that an actual vehicle speed becomes equal to a preset or stored speed value or to a value which is modified in accordance with the preset or stored speed value, and ceasing the control over the throttle opening whenever the automatic drive command has been removed. In either mode, it updates a target speed by one step higher in response to an up command, and also updates a target vehicle speed one step lower in response to a down command. The automatic drive controller 22 serves controlling the turn-on/off and the up/down operation. When an energization signal is on, the controller initiates an automatic drive control, which is ceased when the energization signal is off. The controller updates the target vehicle speed by one step higher in response to an up command, and updates the target vehicle speed by one step lower in response to a down command.

A door lock controller 23 responds to an open or closed condition of a driver's seat lock/unlock switch and an entire door lock/unlock switch which are mounted on a driver's seat door, and other door lock-/unlock switches mounted on the remaining doors and also to a vehicle condition including the vehicle speed by con-trolling the energization for a lock/unlock operation of each door, and also responds to an energization signal (ON/OFF) which assumes an on condition by enabling the energization for a lock operation sequentially for the individual doors. In addition, the controller enables the energization for an unlock operation sequentially for the respective doors in response to an energization signal which assumes an off condition unless other blocking conditions apply.

A sun roof contoller 24 controls the opening and closing of a sun roof which is of sliding type in this example. It responds to the operation of a switch which is normally, provided by controlling the drive of the sun roof for its opening or closing movement. When an energization signal is on, it drives the sun roof to its fully open position, and when an energization signal is off, it drives the sun roof to its fully closed position. When an energization signal indicates an up operation, it drives the sun roof in an opening direction by one step of opening, and when the energization signal indicates a down operation, it drives the sun roof in a closing direction by one step.

A window controller 25 controls the opening or closing (raising or lowering) of a sliding glass pane of each door. It controls the opening or closing of a sliding glass pane in response to the operation of a switch which is normally associated with each door. When an energization signal (ON/OFF/UP/DOWN) is on, it drives a sliding glass pane of a door which is disposed beside a driver's seat to its fully closed position, and when the signal is off, it drives the glass pane to its fully open position. When the energization signal indicates an up operation, it drives the glass pane by one step in the closing direction, and when the signal indicates the down operation, it drives the glass pane by one step in the opening direction.

A wiper controller 26 controls the drive applied to a wiper in response to the operation of a switch which is normally provided. When an energization signal (ON-/OFF/UP/DOWN) is on, it drives a wiper at a standard rate, and when the signal is off, it ceases to drive the wiper and positions it at its standby position. When the energization signal indicates an up level, it increases the rate of operation of the wiper by one step higher, and when the signal indicates a down level, it decreases the rate of operation of the wiper by one step lower.

A cigar lighter controller 27 operates by changing a cigar lighter projecting mechanism into a retract/-project mechanism. When an energization signal (ON/-OFF) is on, it retracts a cigar lighter while when the signal is off, it projects the cigar lighter forward if the latter does not reach a given temperature. In other respects, the arrangement is similar to a conventional one, energizing the cigar lighter in response to a mechanical contact when it is pushed inward and deenergizing it upon reaching a given temperature while projecting it forward.

A headlight controller 28 responds to a high light/low light/off switch by illuminating a small light and raising a headlight from its stowed position and illuminating it, with the angle of projection being established in accordance with an angle command switch when the switch assumes its high light position, by deenergizing the headlight and illuminating only the small light when the switch assumes its low light position, and by deenergizing the small light and stowing the headlight when the switch assumes its off position. In addition, when an energization signal (ON/OFF/UP/DOWN) is on, it illuminates the small light and brings the headlight from its stowed position and illuminates it; when the signal indicates an up operation, it establishes an angle of projection for the headlight which is higher by one step; when the signal indicates a down operation, it establishes an angle of projection for the headlight which is lower by one step; and when the signal is off, it deenergizes the headlight while illuminating only the small light.

A defroster controller 29 responds to an operation of an normal on/off switch by controlling the energization or deenergization of a heater which is embedded in a rear window. When an energization signal (ON/OFF) is on, it energizes the heater while it deenergizes the heater when the signal is off.

A buzzer controller 16 energizes a buzzer (not shown) when an energization signal is on, and ceases to operate the buzzer when the signal is off. As will be described later, the buzzer is energized whenever the driver keeps his eyes closed over a given time interval continuously, which condition is regarded as a dooze. The buzzer is also energized when a processing of an image pattern is disabled while either mode switch 5E or 5M is closed.

FIGS. 2a and 2b show a main routine performed by the microprocessors 6 and 8 while the detailed operation or subroutines are shown in FIGS. 3a to 3l. The control operation by the microprocessors 6 and 8 will now be described with reference to these Figures. Initially referring to FIGS. 2a and 2b, the general operation will be described. When the power is turned on, the microprocessor 6 executes an initialization (step 1: Hereafter, the numeral in parentheses represents a step.) where both input and output ports are initialized and the electrical devices 19 to 30 as well as the television camera 3 are turned off or brought to its standby condition while clearing internal registers, counters, flags and RAM's 10, 11 and 13. The switches 5E and 5M are then examined. If either switch 5E or 5M assumes a closed condition or is closed, the microprocessor 6 applies an energization signal of an on condition to the illumination controller 19 and the television camera 3. When at least one of the switches 5E and 5M has been closed, but the both changes to its open condition, the microprocessor feeds an energization signal of an off condition to the illumination controller 19 and the television camera 3 and also feeds an energization signal of an off level to the buzzer controller 30. When both mode switches 5E and 5M are open, the program waits for at least one of them to become closed, and no processing of an image pattern is executed.

When at least one of the switches 5E and 5M is closed, an on energization signal is applied to the controller 19 and the camera 3, and at a given time interval thereafter (which is required for the brightness level provided by the illumination lamp to be settled and for the face of the driver comes to stop at the driving position), the operation of writing one frame of video data in which one picture element comprises four bits representing halftone level into the one frame memory 13 is initiated in synchronism with the frame sync pulse from the television camera 3 (4).

The microprocessor 6 then determines the number of picture elements having halftone levels which extend from the maximum level, which represents the maximum brightness level in the image being read, to a given extent therebelow, thus producing a brightness histogram in which the ordinate represents the number of picture elements while the abscissa represents halftone level, which is then stored in RAM 10. A deviation for each halftone level between the resulting histogram and a standard histogram stored in ROM 9 is derived and the squares of individual deviations are added together (5). The sum is compared against a reference value (6), and if the sum is out of a given range, an energization signal indicating an increase (up) or decrease (down) depending on the sum is applied to the illumination controller 19 (7). At a given time interval thereafter (which is required for the brightness produced by the lamp 4 to be settled to a new brightness level), another frame of video data is again written into the memory 13 (4). The calculation of deviations, squaring and addition are performed by the microprocessor 8. In this manner, the brightness produced by the lamp 4 is controlled so that the histogram of the resulting video data matches the standard histogram within a given range (4, 5, 6, 7).

When the brightness level has been established, the video data which is then stored in the memory 13 has been obtained under a proper brightness level, and hence is utilized as a source data which is then converted into a bi-level data. Specifically, data comprising a single bit per picture element which represents the presence or absence of an image (black) therein is then stored in the memory 11 (8). The bi-level data stored in the memory 11 represents a basic data which is used in the pattern recognition.

Based on the basic data, the microprocessor 6 then detects the initial location of the face (or more exactly, the location of the pupil and mouth) and stores it in its internal register. In the event such detection is prevented, IPDF counter (internal register which represents the number of passes) is incremented by 1 (10). The counter is then examined to see if it has reached 16 (11), and if the count does not reach 16, the bi-level reference value is decremented by one, and the decremented reference value is used to repeat the conversion into bi-level data (8), followed by the detection of the initial location (9). In this manner, the detection of the initial location is repeatedly executed each time decrementing the reference value by one. When the detection of the initial location fails during 16 consecutive passes, it is determined that the source data has not been proper. Thus IPDF counter is cleared (13), and the program returns to reading the video data (4).

When the initial location has been successfully detected (9), IPDF counter is cleared (14), and the program proceeds to an automatic detection/automatic control of energization beginning with the reading of fresh video data (15; FIG. 2b), the tracking of the location of face (pupil and mouth) (18, 26; FIG. 2b), the detection of pattern of blinking (opening and closing) the eye (23 or 72 to 91; FIGS. 3e, 3f), the detection of the location of eye (pupil) (23 or 92 to 105; FIGS. 3f, 3g), the detection of the configuration of mouth (27 or 106 to 121; FIGS. 3h, 3i), the detection of a pattern in which the configuration of the mouth changes (27 or 122 to 171; FIGS. 3i, 3j, 3k, 3l) and output processing (29a; FIG. 2b).

During this control, one frame of video data is initially written into the memory 13 (15), and is compared against the latest reference value established to derive bi-level data which is then stored in the memory 11 (16). When the mode switch 5E is on (17), the tracking of the eye is executed (18), and if the tracking fails, the program returns to reading the video data (15), conversion into bi-level data (16) and the tracking of the eye (18). After the failure of detecting the eye after eight passes of execution, it is determined that the current location of the face is improper or the detection of the initial location of the face which has been obtained during the step 9 has been improper, thus returning to the step 4 (18, 19, 20, 15 to 17, 22a, 22b, 2 to 15). If the program has succeeded in the tracking, a decision (23) provides output data which depends on the detected pattern of blinking the eye and the movement of the eye location, and IPDF counter which indicates the number of failures is cleared (24).

When the mode switch 5M is on (25), the mouth is tracked (26) and a failure to detect the mouth after eight passes results in a determination that the current location of the face is improper or that the detection of the initial location of the face which has been ontained at step 9 has been improper, and the program then returns to step 4 (26, 19, 20, 15 to 17, 25, 22a, 22b, 2 to 15). If the mouth has been successfully tracked, a decision (27) determines the configuration of the mouth and pattern in which the configuration changes, delivers corresponding output data and clears IPDF counter which indicates the number of failures (28). At output step 29a, previous output data is compared against the current output data, and only bits which differ therebetween are updated to the current bits for delivery to the interface 14.

Figure 4A:
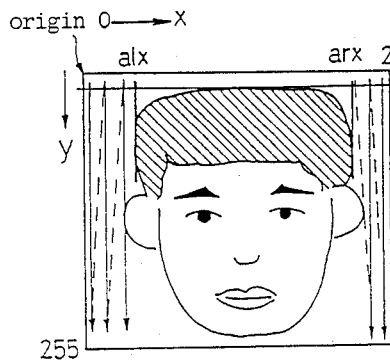
FIGS. 4a, 4b, 4c, 4d, 4e, 4f and 4g are schematic views illustrating an image of an object observed by a camera either in whole or in part.
Figure 3A:
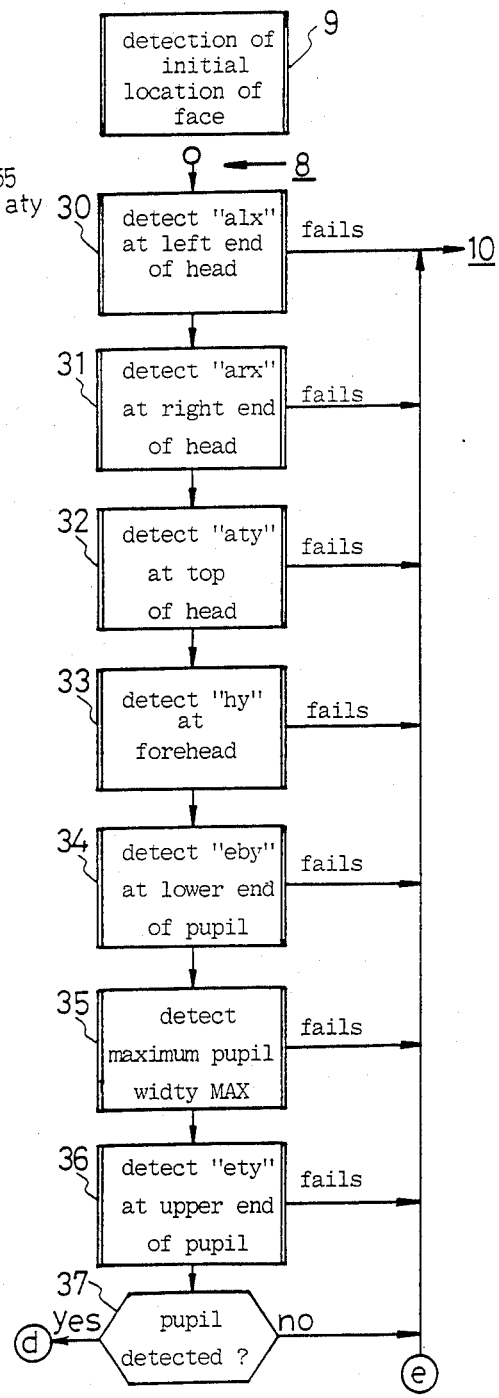
Figure 3B:
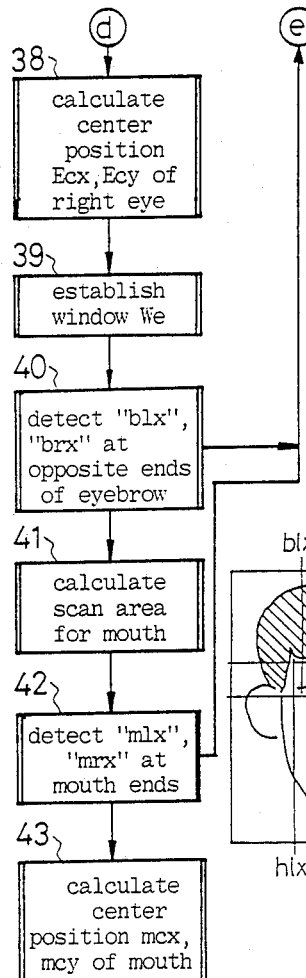

FIGS. 3a and 3b show the routine of detecting the initial location of the face (9) in more detail. Specifically, when entering the routine of detecting the initial location of the face (9), the microprocessor 6 initially detects the left end alx of the head (30). What is meant by "alx" is illustrated in FIG. 4a. Thus, one frame of bi-level data stored in the memory 11 is scanned along a vertical line (extending in y direction) from the left side, starting from an origin O of the image. For each line, when the bi-level data read indicates a white, a run counter is cleared, while the run counter is incremented each time a black appears. When the count, which indicates a number of black picture elements (which occur consecutively along the vertical line y), reaches a given value, it is determined that this represents the left end of the face, thus storing "alx" in an internal register (successful detection). If the run counter does not reach a given count when scanning along 256 lines (0 to 255) which are spaced apart in the horizontal (x) direction, indicating a failure of detection, it is determined that the current video data read is an error and the program proceeds to step 10 shown in FIG. 2a. However, when the left end alx of the face has been detected, the program then proceeds to the detection of the right end arx (FIG. 4a) (31). The scanning now starts from the 255-th line and proceeds to the left, again counting the number of consecutive black picture elements by means of the run counter. The particular number of the line at which the count has reached a given value represents arx. In the event of failure to detect such count, the program proceeds to step 10 shown in FIG. 2a.

When the right end arx of the face has been detected, the microprocessor 6 then detects the top end aty (see FIG. 4a) of the head (32). At this time, the scan takes place along a horizontal direction (x direction), and starts with y=0, the scan being limited to a region from alx to arx (thus, the line ends at arx). The run counter is cleared upon completion of the scan of each line. The run counter is cleared when the bi-level data read represents a white, and is incremented by 1 in response to a black. Accordingly, the count in the run counter represents a number of black picture elements which appear consecutively in the x direction. When the count reaches a given value, the corresponding y address aty is stored as the top end aty of the head. If the microprocessor fails to detect the top end, the program then proceeds to step 10 shown in FIG. 2a.

Figure 4B:
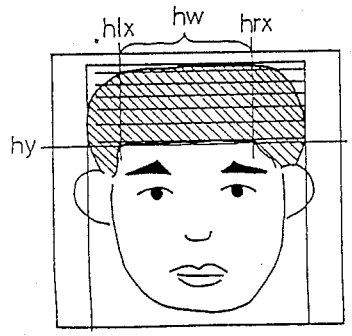

The microprocessor 6 then detects the forehead hy (see FIG. 4b) (33). In this instance, the scan covers from alx to ary in the horizontal (x) direction and below aty in the y direction. The scan takes place in the horizontal (x) direction, starting from x=alx and y=aty. In the similar manner as with the detection of the top end aty of the head, the number of white picture elements which occur consecutively in the horizontal direction is counted. Thus, the run counter is incremented each time a white data is read, and is cleared each time a black data is read. When the count reaches a given value, the corresponding vertical address hy is stored as an indication of the detection of the forehead hy. Specifically, the starting position hlx and the terminal position hrx of a region where white's appear consecutively are stored. In the event of failure of such detection, the program proceeds to step 10 shown in FIG. 2a.

Figure 4C:
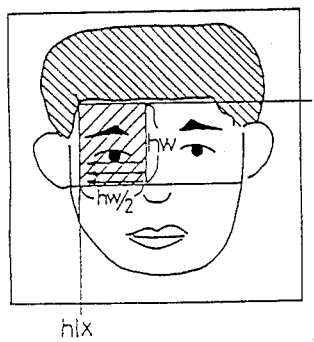
Figure 4D:
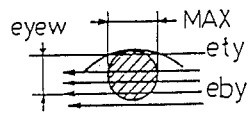
Figure 4E:
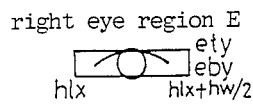

The microprocessor then detects the lower end eby (FIG. 4d) of the pupil (34). The scan covers an area defined by hlx to hlx+hw/2 in the horizontal direction and by hy to hy +hw/2 in the vertical direction, or a hatched area in FIG. 4c where hw=hrx−hlx. The scan takes place along the horizontal (x) line, and starts from a point indicated by x=hlx+hw/2 and y=hy+hw/2. The run counter is cleared each time the scan line is changed and is also when white data is read, and is incremented by 1 each time black data is read. When the count reaches a given value, it is determined that the lower end eby of the pupil has been detected, and the corresponding y address eby is stored. The program then proceeds to the detection of maximum pupil width MAX (35). The scan and the clearing/incrementing of the run counter occur in the similar manner as before until the count in the run counter reaches a given value. Thus, when white data is read, the count in the run counter is compared against the prevailing maximum value which has been saved, and if the count in the run counter exceeds the saved value, the count in the run counter is then saved as updated maximum value MAX while clearing the run counter. When the count reaches a given value (36), it is determined that the top end ety of the pupil has been detected and the corresponding y address ety is stored. In the event either one of the detection of the lower end eby, the maximum value MAX and the top end ety fails, the program proceeds to step 10 shown in FIG. 2a.

However, if the described detections have been successfully made, it is then examined whether the following inequalities apply:

$eyew = eby - ety > hw/20$ $MAX > hw/15$, and $MAX < eyew \leq 3$

If these inequalities apply, this means that the pupil has been successfully detected, and the program proceeds to step 38. However, if these inequalities do not apply, this means the failure to detect the pupil, and the program proceeds to step 10 shown in FIG. 2a.

At step 38, the center positions Ecx, Ecy of the detected pupil are calculated. This takes by considering a region from hlx to hlx+hw/2 and ety to eby as representing an eye region, and the bi-level data of this region is supplied to the microprocessor 8 to determine a centroid of distributed black picture elements, which is then translated into addresses on a frame. Thus, the position of the centroid is defined by x=Ecx and y=Ecy.

The microprocessor 6 then establishes a window We (FIGS. 5a to 5f) which defines an area to be scanned for tracking the eye and which is centered about the centroid position Ecx, Ecy (39). Thus, the window We is defined by $Ecx - k_1$ to $Ecx + k_1$ and $Ecy - k_2$ to $Ecy + k_2$ where $k_1$ and $k_2$ are constants. The coordinates which define the window are stored. It is to be understood that the window We represents a very small area compared to the area of one frame.

Figure 4F:
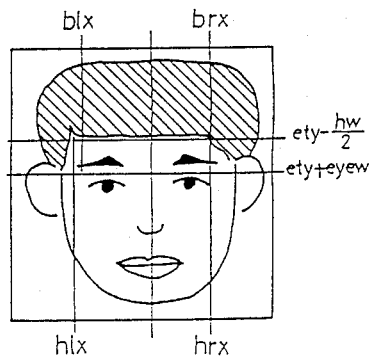

The microprocessor detects opposite ends blx, brx (FIG. 4f) of the eyebrow (40). In the present embodiment, a control over the energization of any electrical device is not performed in accordance with the configuration or location of the eyebrow (even though such control may be performed as desired), but the detection of the eyebrow is performed in order to determine the area for scan which is used to detect a mouth region. In the step of detecting the opposite ends blx, brx of the eyeblow (40), the scan takes place from hlx to hrx in the x direction and from ety−hw/2 to ety−eyew in the y direction, and is performed along a scan line extending in the horizontal (x) direction. The number of black picture elements per scan line is counted, it being understood that the count in this instance is not the number of consecutive black picture elements. The left end position of the eyebrow is defined by the x address blx of the leftmost black picture element on the scan line in which a maximum count has been reached while the right end position is defined by the x address brx of the rightmost black picture element, and such positions are stored. If the program fails to detect the eyebrow, it then proceeds to step 10 shown in FIG. 2a.

Figure 4G:
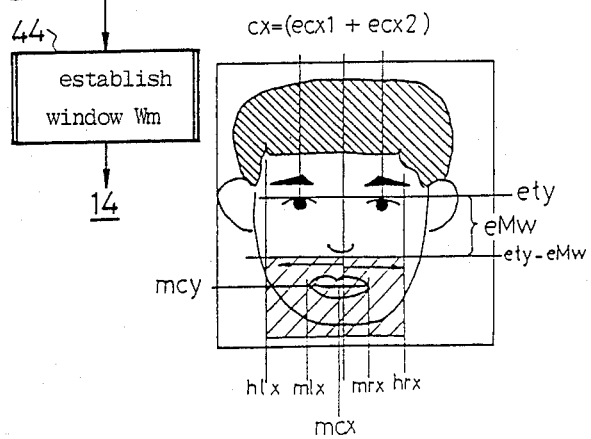

The program then calculates a scan area which is used for detecting the mouth (41). Specifically, the scan area for detecting the mouth is defined by blx to brx and ety−eMW to 255 (the lower end of the frame) (41). eMW represents a constant. The scan then takes place along a scan line which extends horizontally (in the x direction) over the region from blx to brx and ety to eMW to 255, starting from x=blx and y=ety−eMW. The number of black picture elements (it is to be noted that this time, what is counted is not the number of consecutive black picture elements) per scan line is counted. Each time one scan line has been completed, the resulting count is compared against a maximum value which is saved, and if the current count exceeds the saved value, it is substituted therefor, thus updating the maximum value. As long as the count continues to increase in comparison to the count of previous line or lines, the scan proceeds to the next following scan line. When the count of a current scan line is less than the saved maximum value, it is determined that the preceding scan line has been on the horizontal line of the mouth or the tangential line between the upper and the lower lip, and the y address mcy (FIG. 4g) of the preceding line is stored as the y address of the center of mouth, and a median value mcx between the starting and the ending black on that preceding scan line is stored as the x address of the center of mouth (calculation of the location of the center of mouth mcx, mcy: 43). In the event such detection has failed, the program proceeds to step 10 shown in FIG. 2a.

Figure 6A:
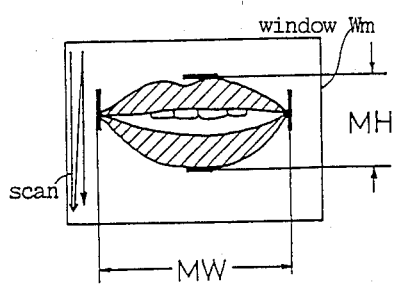
FIG. 6a is a schematic view of a window region and which is used in tracking the movement of the mouth, and a mouth detected therein.

The microprocessor 6 then establishes a window Wm (FIG. 6a) which is centered about the centroid position mcx, mcy and which is used to define an area over which a tracking scan for the mouth is performed (44). Specifically, the region for the window Wm is defined by $mcx - k_3$ to $mcx + k_3$ $mcy - k_4$ to $mcy + k_4$ where $k_3$, $k_4$ are constants. These parameters are stored. It is to be understood that the window Wm represents a very small area relative to the area of one frame.

The step of locating the initial location of the face (9) shown in FIG. 2a has been specifically described above. After passing this step and when the program proceeds to step 15, the initial locations (Ecx, Ecy, We, mcx, mcy and Wm) are stored either in internal registers or RAM 10.

Figure 3C:
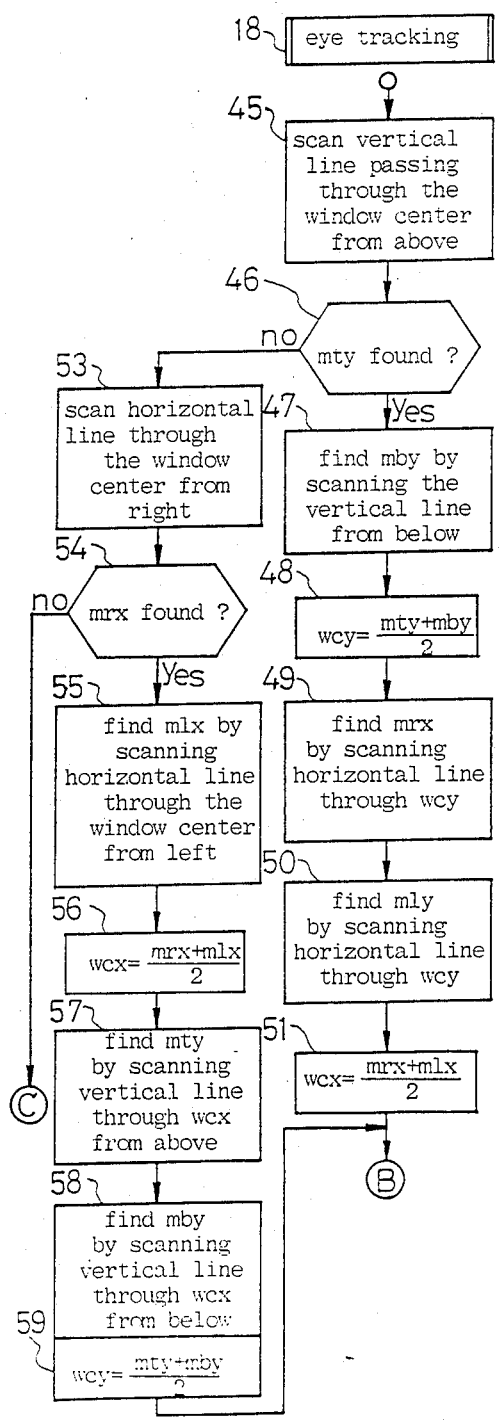
Figure 3F:
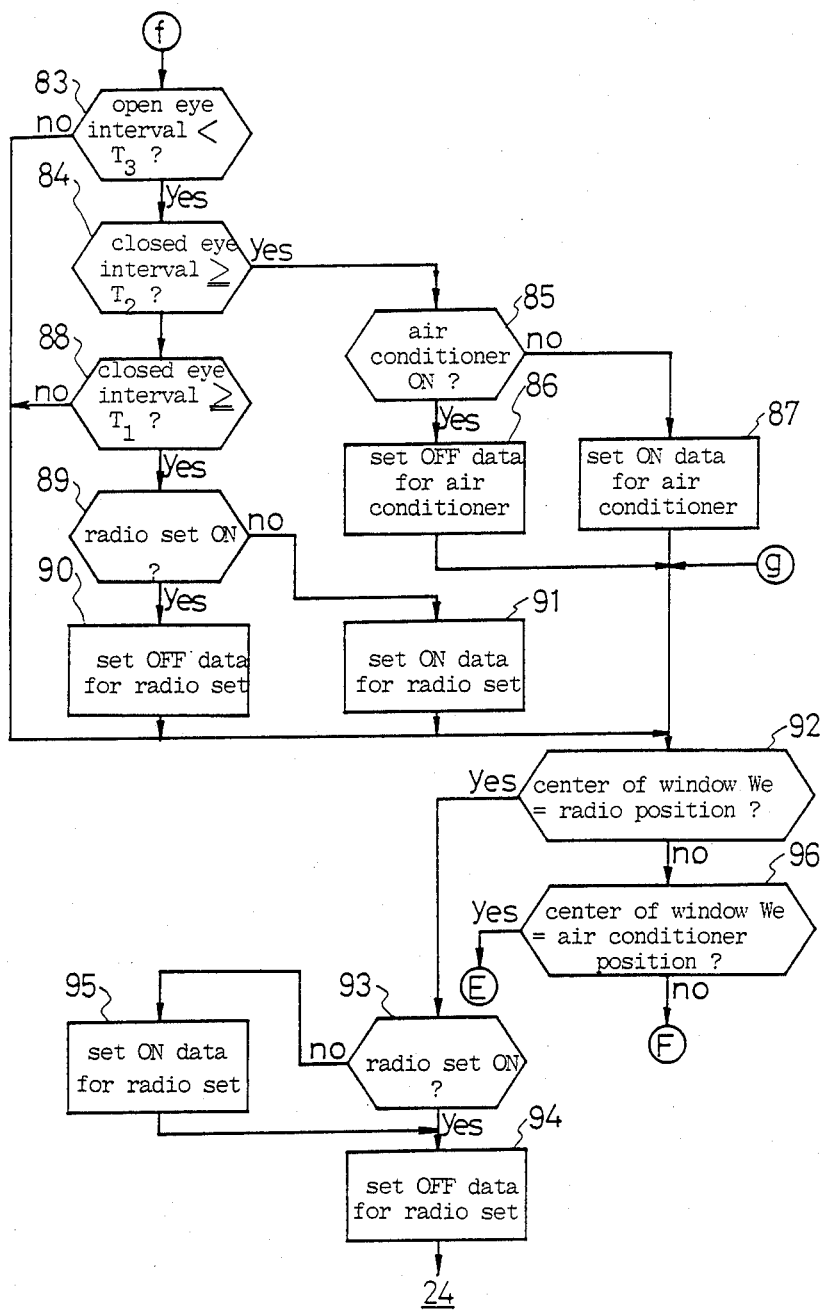
Figure 3G:
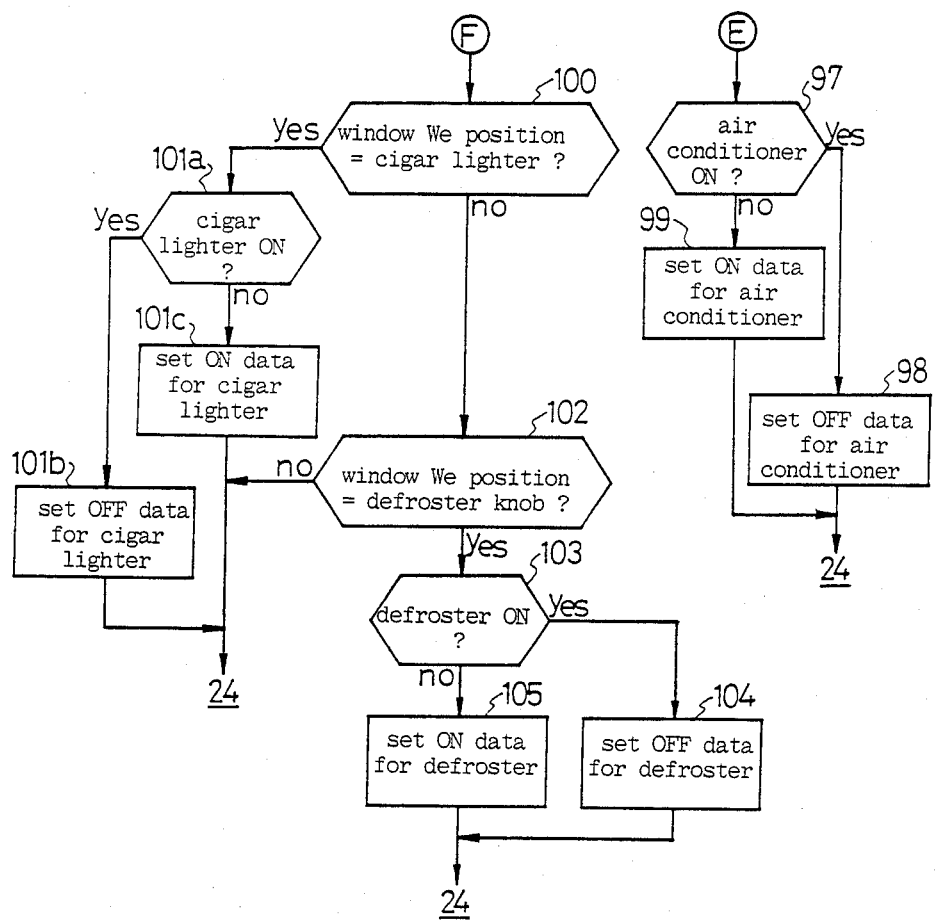
Figure 3H:
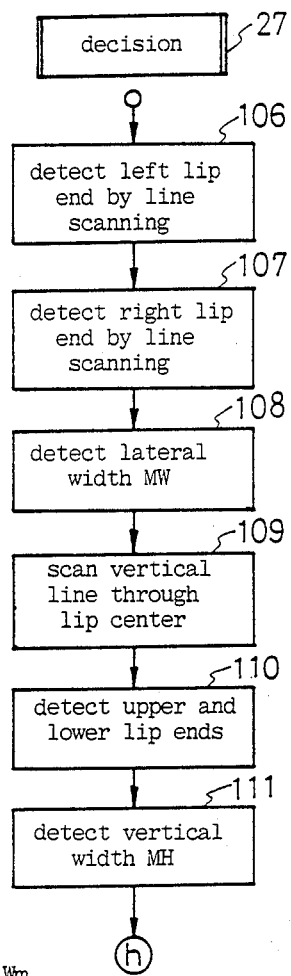

One frame of video data is then written into the memory 13 (15), and converted into bi-level data which is then written into the memory 11 (16), followed by the eye tracking operation (18) which will be described in detail with reference to FIGS. 3c and 3d.

Upon entering the routine of tracking the eye (18), the microprocessor 6 initially determines a scan area from which the video data is to be read from the memory 11 so as to be coincident with the region of the window We which is already established. A data readout from the memory 11 takes place by scanning data located at the x coordinate of the center of the window We from up to down or from y=0 to y=255, thus counting the number of consecutive black picture elements. When the count reaches a given value, it is determined that the upper end mty of the pupil (FIG. 5a) has been determined (45, 46). The corresponding y address mty is stored. Next, another scan is made at the same x coordinate from down to above, again counting a number of consecutive black picture elements. When the count reaches a given value, it is determined that the lower end of the pupil (mby) has been determined, and the corresponding y address mby is stored (47). The center wcy between the upper and the lower end, representing a central position in the vertical direction, is then calculated (48). Choosing the y coordinate equal to wcy, a scan is then made from the right to detect the right end of the pupil mrx (FIG. 5b) and the corresponding x address mrx is stored (49). Another scan is made from the left to detect the left end mlx of the pupil (FIG. 5b) and the corresponding x address mlx is stored (50). The center wcx between the left and the right end, as viewed in the horizontal direction, is then calculated (51). After such detections, data wcy and wcx which are obtained in the manner mentioned above are temporarily considered as representing the center of the pupil, and a window We which is centered about such data is calculated and updated (52; the updated window We defines a scan area for the next detection of the location of the pupil). The program then proceeds to the next decision step 23.

Figure 5A:
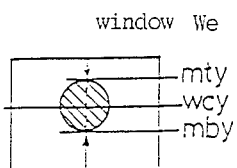
Figure 5B:
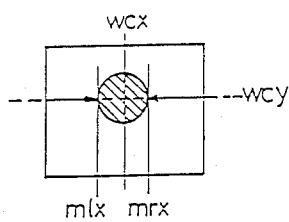
Figure 5C:
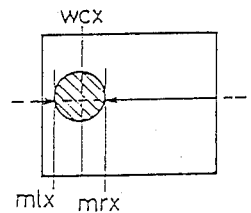
Figure 5D:
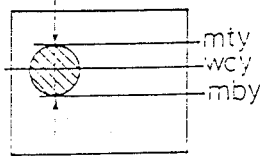

However, if the step 45 fails to detect the upper end of the pupil because the pupil is displaced to the left or to the right from the center of the window, data located at the y coordinate corresponding to the centroid of the window We are scanned from right to left to detect mrx (where the number of consecutive black picture elements is equal to a given value; FIG. 5c) (53). If this number has been successfully detected, another scan is made from left to right to detect mlx (FIG. 5c) (55). The center wcx between the right and the left end of the pupil is then calculated (56). Next data located at x=wcx are scanned from above to detect the upper end mty (see FIG. 5d) (57), and the same data is scanned from below to detect the lower end mby (58). The center wcy between the upper and the lower end, as viewed in the vertical direction, is then calculated (59). Upon completion of such detections, data wcy, wcx obtained are considered temporarily as representing the center of the pupil, and the window We is then calculated so as to be centered about such data, thus updating it. The program then proceeds to the next step 23.

If the step 45 fails to detect mty and the step 53 fails to detect mrx, the program proceeds to step 60 (FIG. 3d). Bi-level data is scanned across the window We beginning from the upper, left corner and terminating at the lower, right corner. Referring to FIG. 5e, this takes place by choosing a start address for reading the bi-level data from the memory 11 at the upper, left corner of the window We, and subsequently both x and y addresses are similarly incremented by m and n, respectively. In this manner, a point A located at the upper, left corner of the pupil is detected, and the corresponding addresses mlx and mty are stored (60). The bi-level data is again scanned across the window We beginning from the lower, right corner and terminating at the upper, left corner, by initially choosing a start address at the lower, right corner of the window We and subsequently decrementing both x and y addresses by m and n, respectively simultaneously. In this manner, a point B located at the lower, right end of the pupil is detected, and corresponding addresses mrx, mby are stored (62). Center wcx, wcy of the detected addresses is calculated (63, 64) and stored. After such detections, data wcx, wcy obtained are tentatively considered as representing the center of the pupil, and a window We which is centered thereabout is then calculated an updated. The program then proceeds to the decision step 23.

In the event step 45 fails to detect mty, the step 53 fails to detect mrx and the step 60 fails to detect the point A, the program proceeds to step 65. The bi-level data is scanned across the window We beginning with the upper, right corner and terminating at the lower, left corner, by choosing a start address to read the bi-level rate from the memory 11 so as to be equal to the upper, right corner of the window We, and subsequently incrementing the x address by m and y address by n in a sequential manner. The bi-level data is again scanned across the window We starting from the lower, left corner and terminating at the upper, right corner, by choosing a start address at the lower, left corner of the window We and sequentially incrementing x address by m and decrementing y address by n. In this manner, a point B located at the lower, left corner of the pupil is detected and corresponding addresses mlx, mby are stored (67). A center wcx, wcy of the detected addresses is calculated (68, 69) and stored. After such detections, data wcx, wcy obtained is tentatively considered as representing the center of the pupil, and a window We which is centered thereabout is calculated and updated (52). The program then proceeds to the decision step 23.

If all of the steps 45, 53, 60 and 66 fail to detect the pupil, the program proceeds to the step 19 shown in FIG. 2b.

What has been described covers the tracking operation for the eye (18). While not illustrated by means of a flowchart, the tracking operation for the mouth (26 in FIG. 2b) takes place in the similar manner as the tracking operation (18) for the eye, based on the window Wm which is previously established. In this manner, the center of the mouth is detected to update the memory, while also updating the window Wm.

The decision step 23 shown in FIG. 2b is illustrated in further detail in FIGS. 3e, 3f and 3g. During the decision step, output data which is delivered from the step 29a of FIG. 2b is established on the basis of results of detections of an eye blinking pattern and a pupil move position. Specifically, upon entering the decision step (23), the microprocessor 6 causes the microprocessor 8 to calculate a vertical diameter EH of the pupil (70). Since it is possible that the center of the pupil wcx, wcy which is determined during the tracking operation for the eye (18) may not represent an accurate center, the microprocessor 6 establishes a narrower window MWe than the window We, but which is centered about (wcx, wcy) and are representing a rectangle circumscribing a circle having a radius which is equal to the diameter B of the pupil. The microprocessor 6 reads the bi-level data within such narrower window from the frame memory 11 and feeds it to the microprocessor 8. The microprocessor 8 then scans the bi-level data of the window MWe along a scan line which extends in the y direction from left to right, counting the number of consecutive picture elements along each scan line. Upon completion of each scan of a single line, the count is compared against a saved maximum of such number of consecutive black picture elements, and if the count exceeds the saved maximum, the maximum is updated by the present count. On the contrary, if the count becomes less than the saved maximum value, the prevailing maximum which is saved is considered as representing the diameter EH of the pupil in the vertical direction, which is then stored. A corresponding line address NEx is stored. The microprocessor 8 then calculates a horizontal diameter EW of the pupil (71). Specifically, the bi-level data of the window MWe is scanned in the horizontal (x) direction, and the scan starts with the lowermost scan line and proceeds upward. The number of consecutive black picture elements on its scan line is counted, and upon completion of each scan, the prevailing count is compared against a saved maximum number of consecutive black picture elements. If the prevailing count is greater, such count is used to update the saved maximum. On the contrary, if the count becomes less than the saved maximum, it is determined that the prevailing saved maximum represents the horizontal diameter EW of the pupil, which is stored together with its corresponding line address NEy. A ratio EH/EW is calculated and is fed to the microprocessor 6 togehter NEx and NEy.

In response to such data, the microprocessor 6 converts NEx, NEy into corresponding addresses in the frame, which addresses are stored as updated center wcx, wcy of the pupil. The window We is also updated so as to be centered about such addresses or coordinates. The ratio EH/EW is compared against a constant K (72), and if the former is equal to or greater than the latter, it is determined that the eye is open while if the former is less than the latter, it is determined that the eye is closed. When the eye is open, a closed eye flag is examined (79), and if such flag is set, this means that the eye has been closed immediately before or during a previous pass, but is now opened. Accordingly, the content of a T counter which counts a closed eye time interval is transferred to a closed eye time interval register (thus read the closed eye interval) (80). To enable an open eye time interval to be counted, the T counter is now re-set (81), and the closed eye flag is cleared (82). If it is found at the step 79 that the closed eye flag is not set, this means that the eye has been open during the previous pass, and hence the program proceeds to a subsequent step 92.

When examining the presence of a closed eye at step 72, the closed eye flag is examined (73), and if it is not set, this means that the eye has been open during a previous pass, but is now closed. Accordingly, the content of the T counter which counts an open eye time interval is transferred to an open eye time interval register (thus reading an open eye time interval) (74) and the T counter is re-set to enable a closed eye time interval to be counted (75). The closed eye flag is then set (76). When it is found at step 73 that the closed eye flag is set, this means that the eye has been closed during a previous pass to enable a counting of the closed ey time interval by the T counter and is also closed now, and accordingly the occurrence of a dooze is determined by comparing a count T in the T counter against a reference value Ts which is fixed (77). If $T > Ts$, the occurrence of a dooze is likely. An on energization signal is applied to the buzzer controller 30 (78) and the program returns to the step 2 shown in the main routine of FIG. 2a. It will be understood that when both mode command switches 5E and 5M are open, the program proceeds through steps 2-3-29b to apply an off energization signal to the buzzer controller 30 (29b), and accordingly, the driver may interrupt the operation of the buzzer by momentarily opening the both switches 5E and 5M.

When the eye changes from its closed to its open condition (72-79 to 82), the content of the open eye interval register (which indicates the open eye interval during a previous pass since the eye has been open now and the T counter is now counting the time duration of the open eye condition) is compared against an interval value $T_3$ which is slightly shorter than a time period corresponding to a natural blinking (83). If the open eye interval of the previous pass is less than $T_3$, it is determined that there has been an intentional blinking, and the closed eye interval which prevailed immediately before the eye has been opened is compared against a time value $T_2$ which is substantially greater than the closed eye interval which occurs during a natural blinking (84). If the closed eye interval of the previous pass is equal to or greater than $T_2$, this is a relatively long closed eye interval which is considered to be intentional. Such closed eye condition is assigned to the control of the air conditioner, and accordingly, the program proceeds to the air conditioner control which begins with step 85. If the closed eye interval of the previous pass is less than $T_2$, the closed eye interval which prevailed immediately before the eye is opened is compared against a time value $T_1$ which is slightly greater than the closed eye interval which occurs during a natural blinking (88). If such closed eye interval is equal to or greater than $T_1$, this is a relatively long closed eye interval which is considered to be intentional. Such closed eye interval is assigned to the control over the radio set. Accordingly, the program proceeds to the control over the radio set which begins with step 89. If it is found at step 83 that the open eye interval of the previous pass is less than $T_3$, it is determined to be a result of a natural blinking. If a closed eye interval which prevailed before the eye is opened is less than $T_1$, this is also determined to be a result of a natural blinking, and the program proceeds to the next step 92. It is to be noted that the arrangement is chosen such that "the closed eye interval as a result of natural blinking" $< T_1 < T_2 < T_s < T_3 <$ "natural blinking period".

When it is determined that there has been an intentional blinking directed toward the control over the air conditioner (83-84-85), that portion of data currently delivered t the interface which is allocated to the air conditioner controller 21 is examined, and if such data indicates an on condition, air conditioner off data is set (86). If such data indicates an off condition, air conditioner on data is set (87). When it is determined that there has been an intentional blinking directed toward the control over the radio set (83-84-88-89), that portion of data currently delivered to the interface 44 which is allocated to the radio set controller 20 is examined, and if it indicates an on condition, radio off data is set (90). If such data indicates an off condition, radio on data is set (91). Data which is set in this manner is delivered to the interface 14 for updating the output at step 29a (FIG. 2b) which will be described later.

Using data wcx, wcy representing the center of the pupil and which is updated as a result of accurate detections which took place at steps 70, 71, and data Ecx, Ecy representing the initial location of the center of the pupil which is detected and stored at step 38 (FIG. 3b) in the routine of detecting the initial location of the face (9), the microprocessor 6 then determines a vector, having a direction and a deviation, which starts at Ecx, Ecy and ends at wcx, wcy. The vector determined is compared against a vector range allocated to the radio set, a vector range allocated to the air conditioner, a vector range allocated to the cigar lighter and a vector range allocated to an operating knob of the defroster (92, 96, 100, 102), respectively. When the vector determined lies within a particular vector range which is allocated to the radio set, that portion of data delivered to the interface 14 which is allocated to the radio set is examined (93), and if it represents an on energization signal, a particular bit of output data to be delivered next which is allocated to the radio set is set to an off energization signal (94), and if a current bit is an off energization signal, the bit in the output data is set to an on energization signal (95). If the vector determined lies in a vector range allocated to the air conditioner, that portion of currently delivered data which is allocated to the air conditioner is examined (97), and if it is an off energization signal, the bit in the output is set to an off energization signal (98). If the bit in the current data is an off energization signal, the bit in the output data to be delivered next is set to an on energization signal (99). If the vector determined lies in the vector range allocated to the cigar lighter, that portion of delivered data which is allocated to the cigar lighter is examined (101a), and if it is an on energization signal, the bit in the output data to be delivered next is set to an off energization signal (101b) while it is set to an on energization signal if the current bit is an off energization signal (101c). If the vector determined lies in the vector range allocated to the defroster, that portion of current data delivered to the interface 14 which is allocated to the defroster is examined (103), and if it is an on energization signal, a bit in the output data to be delivered next which corresponds to the defroster is set to an off energization signal (104) while the latter bit is set to an on energization signal if the current bit indicates an off energization signal (105). After the output data has been set in the manner mentioned above or when the vector determined does not lie in any of the described vector ranges, it is determined that there has been no command indicated by a movement of the eye (pupil), and the program proceeds to next step (24). What has been described covers the operations performed in the decision step 23 shown in FIG. 2.

Figure 6B:
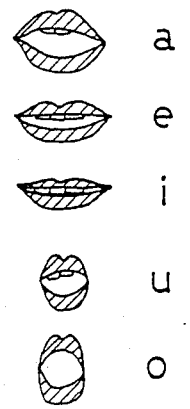
FIG. 6b are a series of illustrations of different configurations of a mouth as different vowels are voiced.
Figure 3J:
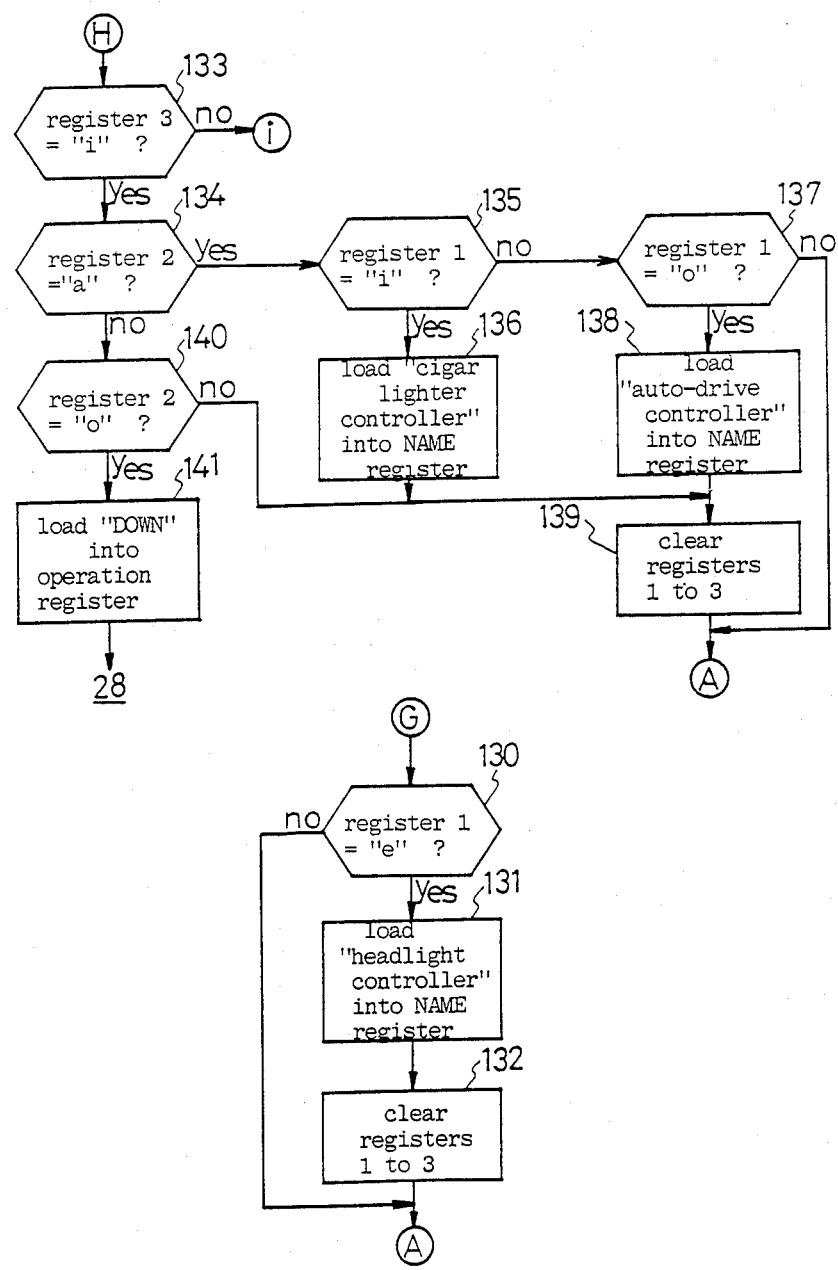
Figure 3K:
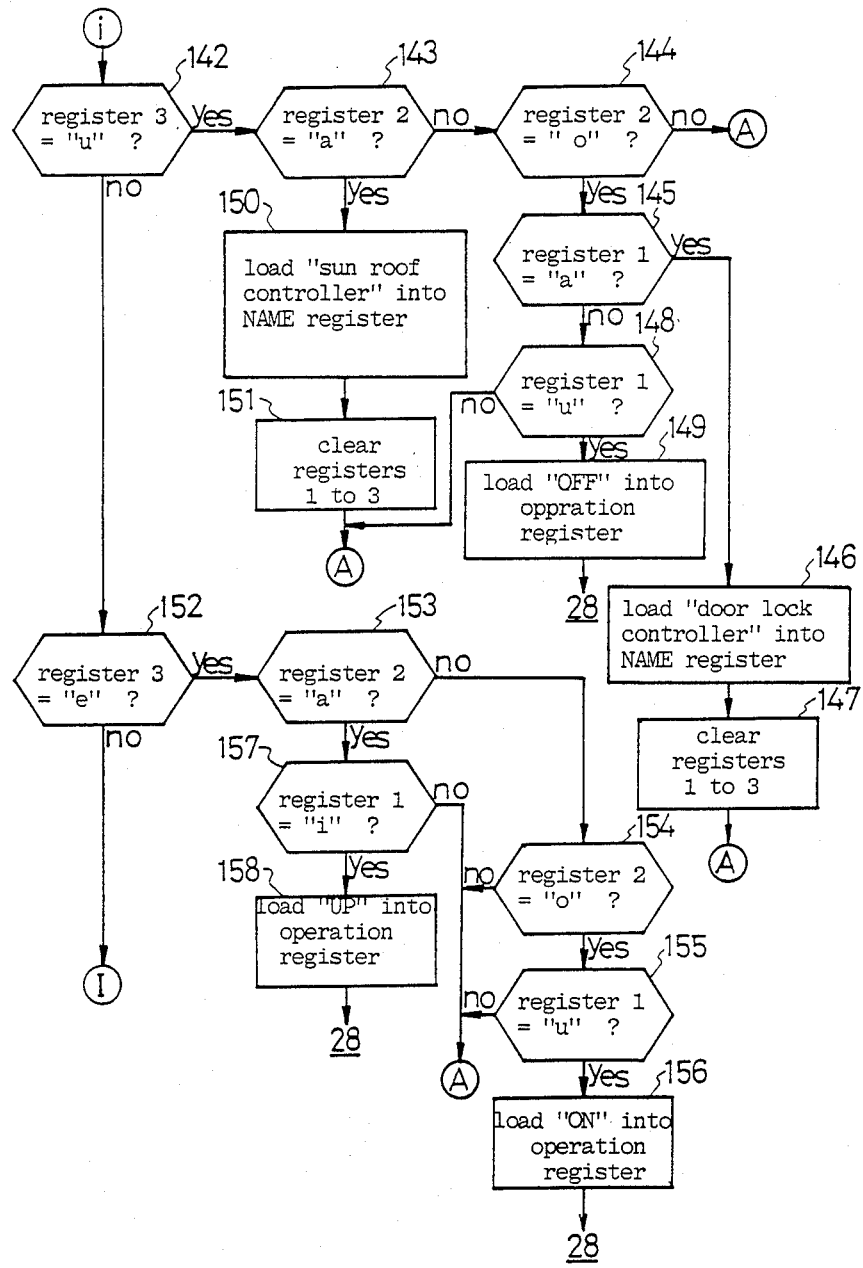

The operations which take place at the decision step 27 will now be described with reference to FIGS. 3f to 3h. The decision routine (27) is entered after reading the mouth tracking routine 26, which takes place in a similar manner as the eye tracking routine 18 mentioned above. In this routine, the microprocessor 6 initially reads the bi-level data of the window Wm which is updated during the mouth tracking routine (26) and feeds it to the microprocessor 8, causing the latter to detect the horizontal width MW and the vertical width MH (see FIG. 6a) of the mouth (106 to 111). In response to the bi-level data, the window Wm, the microprocessor 8 initially determines the scan direction to be in the vertical (y) direction, and then performs a scan operation beginning from the left, each time clearing the run counter after the scan of one line is completed. The run counter is also cleared when white data is read, thus counting the number of consecutive black picture elements. When the count reaches a given value, it is determined that this represents the left-end of the mouth, and corresponding x address Nmlx is stored (106). A scan then takes place from the right, similarly counting the run length of black picture elements, and when the count reaches a given value, it is determined that this represents the right end of the mouth, and corresponding x address Nmrx is stored (107). The microprocessor then calculates the horizontal width of the mouth according to the formula:

$$MW = Mmrx - Mmlx$$

and stores it in a memory (108). The microprocessor then establishes X address at $Nmlx + (Nmrx - Nmlx)/2$, corresponding to the center of the mouth as viewed in the horizontal direction, and then read data located at such X address starting from the top end. The run counter is cleared when white data appears, and is incremented by 1 in response to a black picture element. When the count or the number of consecutive black picture elements reaches a given value, it is determined that the upper end of the lip is detected, and a corresponding y address Nmty is stored (109, 110). Then, data is scanned starting from the lower end, and when the number of consecutive black picture elements reaches a given value, it is determined that the lower end of the lip is detected, and the corresponding y address Nmby is stored (109, 110). The vertical width is then calculated according to the formula:

$$MH = Nmby - Nmty$$

and such width is stored. Data MW, MH, $Nmlx + (Nmrx - Nmlx)/2$ and $Nmty + (Nmby - Nmty)/2$ are transferred to the microprocessor 6. The microprocessor 6 then converts $$Nmlx + (Nmax - Nmlx)/2 \text{ and}$$

$$Nmty + (Nmby - Nmty)/2,$$

representing the coordinates of the center of the mouth within the window (Wm) into frame coordinates, which are stored as updated values mcx, mcy and the window Wm is also updated so as to be centered about mcx, mcy. Wm is then compared against W1 (fixed value) while MH is compared against H1, H2, H3 and H4, respectively, in an attempt to determine if the configuration of the mouth resembles that used to pronounce "a", "i", "u", "e" or "o" (112 to 116) and loading corresponding data into register I (117 to 121). As illustrated in FIG. 6b, the vowels "a" to "o" have horizontal and vertical widths which can be dis-tinguished from each other. Accordingly, any one of these vowels can be specified by the comparison of MW and WH against reference values W1 and H1 to H4.

Acoustical designations assigned to the electrical devices 20 to 29 shown in FIG. 1b are indicated in the Table below, which illustrates the decision of a change in the pattern of configuration of the mouth when pronouncing any designation.

| electrical device | acoustical desitnation | vowels | | | | |
|---|---|---|---|---|---|---|
| 20 | RAJIO (radio set) | a | | i | o | |
| 21 | EACON (air conditioner) | e | | a | o | |
| 22 | OTODORAIVU (auto-drive unit) | o o o | o | a | i | u |
| 23 | DOAROKKU (door lock) | o | a | o | u | |
| 24 | SANRUUFU (sun roof) | | a | u | u | |
| 25 | WUINDOU (window) | u | i | o | u | |
| 26 | WAIPA (wiper) | a | i | a | | |
| 27 | CIGA-RAITA (cigar lighter) | i | a | a | i | a |
| 28 | HEDDO-RAITO (headlight) | e | o | a | i o | |
| 29 | DEFUROSUTA (defroster) | e | u | a | i o | |
| operational | | | | | | |

-continued

| commands | acoustical desitnation | vowels | | |
|---|---|---|---|---|
| ON | UGOKE (move) | u | o | e |
| OFF | SUTOPPU (stop) | u | o | u |
| UP | HIRAKU (open) | i | a | u |
| DOWN | TOJI (close) | | o | i |
| | register number to store vowel data | 1 | 2 | 3 |

Considering the control over the radio set, for example, when the mouth is sequentially configured to pronounce "RAJIO" (name designation) and "UGOKE" (operation command) or if such words are simply pronounced, there result sets of vowels "a-i-o" and "u-o-e". These configurations of the mouth or the vowels pronounced are detected and sequentially stored in registers 1, 2 and 3. Each time the configuration of the mouth for a particular vowel is detected (112 to 121 in FIG. 3*i*), data detected, namely, data representing a vowel detected, is stored in register 1, the content of which is compared against the content of register 3 (122). When they match, this means that the configuration of the mouth for the same vowel is maintained, and hence the program returns to reading fresh video data (15: FIG. 2*b*) without doing anything. However, if they differ, this means there has been a change in the configuration of the n'outh, and accordingly, the content of the register 2 is transferred to the register 1 and the content of the register 3 is transferred to the register 2 while storing the content of the register 1 into the register 3 (123). Thus, detected data for the configuration of the mouth for pronouncing the latest vowel which differs from the configuratin of the mouth for the vowel which is detected immediately before is stored in the register 3. As a result of such transfer of the contents of the registers, when the configuration of the mouth sequences through "RAJIO", data representing the vowels which are indicated in the row of the Table is stored in the registers 1 to 3 at the time the last "O" is detected. Since it is indeterminate when such storage of data representing the configuration of the mouth for these vowels in the registers 1 to 3 has been completed, each time vowel detecting data is stored in the register 3, the program sequences through steps 124 to 171, thus determining whether data for the configuration of the mouth to pronounce the vowels which represent either the electrical device or operation command listed in the Table are stored in the registers 1 to 3. This is equivalent to examining which one of the items in the Table, the content in the registers 1 to 3 or the pattern of configurations of the mouth in a time sequence corresponds to.

If the time sequence is found to correspond to one of the items in the Table, for example, if the register 3 contains "o" data, the register 2 contains "i" data an the register 1 contains "a" data according to the row for the radio set, the program proceeds through steps 124-13-3-142-152-159-163-164, thus loading data representing "RAJIO" in NAME register (165). Alternatively, if the content in the registers 1 to 3 match data indicated on the row for "ON" in the Table, the program proceeds through steps 124-133-142-152-153-154, thus loading "ON" in the operation register (156). At the time operation command data (ON, OFF, UP, DOWN) is stored in the operation register (141, 149, 156, 157), the registers 1 to 3 are cleared, and the program proceeds to the step 28 where IPDF counter, which counts the number of failures, is cleared (28). Then program proceeds to "output" step 29*a* where output data to be delivered next is updated to its on condition (which is determined by the content of the operation command register) for the radio controller 20 (which is determined by the content of the NAME register), thus, updating the output data delivered to the interface 14.

The operation of the embodiment may be summarized together with the operation on the part of the driver, as follows:

(1) Under the condition that the switches 5E and 5M are both open, when the driver closes either switch 5E or 5M, the illumination lamp 4 is energized for illumination with a standard duty cycle and camera 3 is turned on. After a required time delay, one frame of video data for the face of the driver is written into the memory 13, and the illuminance histogram is prepared, which is compared against a preset value to determine whether the illuminance is proper, thus adjusting the brightness achieved by the energization of the illumination lamp. Each time the brightness produced by the illumination lamp is changed, new one frame of video data is written into the memory 13. After such adjustment, the latest data in the memory 13 is compared against the reference value for the maximum level for conversion into bi-level data, which is then stored in the memory 11. On the basis of such bi-level data, the center position of the pupil (for the right eye) and the center position of the mouth are detected, and then stored. The windows We and Wm are established and stored on the basis of such center positions.

As mentioned previously, whenever the detection of the pupil or the mouth fails, the reference value which is used in the conversion into bi-level data is updated by decrementing it by one step lower, and the conversion into bi-level dat is executed again to provide bi-level data which is then stored in the memory 11 as updated value. The center position of the pupil and the mouth is again detected. If such detection fails 16 times consecutively, it follows that the data which has been written into the memory 13 represents an abnormality. A fresh video data is then written into the memory 13 anew, again performing the detection for the initial location of the eye and the mouth as mentioned before.

(2) When the initial location has been successfully detected and when only the mode switch 5E is closed, the eye tracking, the detection of the blinking pattern of the eye as well as the detection of its location (displacement from the initial location, both direction and magnitude) are repeated. Whenever the closed eye condition continues over Ts, a dooze is suspected by turning the buzzer on. The buzzer is turned off when the switch 5E is opened. If the closed eye condition for a time interval less than the natural blinking period ($T_3$) is followed by the closed eye condition which continues over a time interval ($T_1$) which is slightly longer than the closed eye interval for the natural blinking, this is construed as a command to turn the radio set on or off. When such eye blinking pattern is detected and when the radio set is on, the set is turned off, and when the detection occurs while the radio set is off, it is turned on.

When the open eye condition which continues over a time interval less than the natural blinking period ($T_3$) is followed by the closed eye condition which continues over a time interval $T_2$) which is relatively longer than the closed eye interval for the natural blinking, this is construed a a command to turn the air conditioner on or off. If such eye blinking pattern is detected while the air conditioner is on, it is turned off, and if the detection occurs when the air conditioner is off, it is turned on.

A displacement between the center position of the pupil from the initial center position which is obtained during the detection of the initial location is compared against a reference value to determine to which one of the radio set position, the air conditioner position, the cigar lighter position and the defroster knob position, the eye is directed. If it is determined that the eye is directed toward the radio set position, it is turned off if the radio set is currently on while it is turned on if it is off. If the eye is found to be directed toward the air conditioner position, it is controlled in a corresponding manner. Thus, the air conditioner is turned off if the detection occurs during the time it is on, and it is turned on if the detection occurs during the off interval. A similar control operation takes place for the cigar lighter and the defroster knob as well. After such control operation or no determination has been reached, the program returns to reading fresh video data without going any further. When the mode command switch 5E is closed, a control over the energization of the electrical devices in response to such movement of the eye takes place, and accordingly, the mode command switch 5E represents means which specifies a particular area (eye).

(3) When the initiatial location has been successfully detected and only the mode switch 5M is closed, the mouth tracking as well as the detection of a pattern in which the configuration of the mouth changes are executed. If a previous detection has specified either one of the electrical devices 20 to 29 and a subsequent detection specifies an operation command, the specified operation command is applied to the specified electrical device.

Specifically, the configuration of the mouth is detected by detecting only the configuration of the mouth for the vowel in order to assure the reliability of the detection. Each time the configuration of the mouth for a particular vowel is detected, in order to detect a pattern in which the configuration changes, the current configuration detected is compared against the configuration of the mouth which is detected immediately before, and when the both remains the same, no entry of the detected configuration takes place in order to prevent a repeated entry. It will be seen that the pattern of the configuration of the mouth for vowels as a time sequence, which is allocated as an acoustical designation of the electrical devices 20 to 29, and a pattern of the configuration of the mouth for vowels as a time sequence, which is allocated to an operation command, are uniquely specifiable by a combination of configuration of the mouth to pronounce different three or two vowels. Data representing the acoustical designation of the electrical devices 20 to 29 detected is stored in NAME register while data representing an operation command is stored in the operation register. Each time the operation register is updated by a new operation command, a new energization condition (ON, OFF, UP, DOWN) which is determined by the new content of the operation register is established for the particular electrical device which is determined by the content of the NAME register. In this manner, when the mode command switch 5M is closed, the energization of electrical device or devices is controlled in response to the configuration of the mouth, and thus the mode command switch 5M represents means which specifies a particular area (mouth).

(4) When the both mode switches 5E and 5M are closed, the control operation mentioned under the paragraph (1) is executed, followed by the execution of the control operations mentioned under the paragraphs (2) and (3) in the sequence named. Data concerning the energization which is loaded into the output register as a consequence of the control operations of the paragraphs (2) and (3) are delivered to the interface 14 to update it. Whenever a failure of detection occurs in the course of such operation, the program starts again from the paragraph (1). As long as no failure of detection occurs, the control operations according to the paragraphs (2), (3) and the output step (29a) are sequentially repeated. Whenever the operation command detected by the control operation of paragraph (2) (namely, the command over the energization which is reached by the detection of the blinking pattern and the location of the eye) differ from the operation command detected by the control operation of the paragraph (3) (namely, the pattern in which the configuration of the mouth for vowels change as a time sequence) for the same electrical device, the energization signal which is based upon the result of detection according to the paragraph (3) is delivered to the electrical device. Thus, the mouth responsive energization control predominates over the eye responsive energization control, and accordingly, the mode command switch 5M represents means which specifies a predominate control mode.

As a result of the execution of the control over the energization mentioned above, the driver of the vehicle is capable of controlling the turn on/off of the radio set, the air conditioner, the defroster and the cigar ligher in a non-contact manner and without any special movement of his hand, arm or body, by merely closing the mode command switch 5E and opening or closing as well as moving the sight line of the eye.

In addition, by closing only the mode command switch 5M, the driver is also capable of establishing a particular energize/non-energized condition of a particular electrical device without requiring any special movement of his hand, arm or body, by forming his mouth into configurations to pronounce a particular electrical device to be controlled and the particular energization condition thereof with or without pronouncing such acoustical designation of the device. In this manner, no labor effort is required, and no mental concentration is required because no movement of his hand or line of sight is required, thus allowing a comfortable driving operation of the vehicle without detracting from any driving capability and in a safe manner and with reduced fatigue.

As discussed, in accordance with the invention, the location of a particular area in a relatively broad two dimensional region is detected, and such detection data is used to define a window for a relatively narrow region which is located at the center of the particular area so as to be used in the next detection of such location. Each time the particular area is detected, the window is updated, thus enabling the location of the particular area to be detected in a manner following a change in the location of the particular area. In this manner, the particular area can be detected at a high rate and with a high accuracy of detection even for a rapid movement of the particular area. In addition, a change in the location and configuration of the particular area is detected as a time sequence to control the energization of a corresponding electrical device. Accordingly, as compared with a conventional operation such as turning a switch on and off or turning a volume control, which requires a relatively high level of labor effort and mental concentration and which is performed by a man, an object or a device which is subject or not subject to such detection in controlling the energization of an electrical device is eliminated. The activity of a functionally satisfactory man is enhanced while simultaneously enhancing the operating capability of a functionally defective man in operating an electrical device. Rather than the driver of the vehicle, an object or an animal may be subject to detection, thus permitting an automatic control which does not require a human monitoring.

It should be understood that the foregoing description of the invention is intended merely to be illustrative thereof, and that other embodiments and modifications of the invention may be apparent to those skilled in the art without departing from the spirit of the invention.

What we claimed is:

1. An apparatus for commanding an energization of an electrical device comprising:
   illumination means for illuminating an object;
   camera means for converting an optical image of the object into a video signal;
   memory means for storing at least one frame of the video signal;
   output means for delivering an on/off command signal to an electrical device;
   video signal processing means which operates
   (a) to write the video signal into the memory means;
   (b) to read the video signal from the memory means and to detect at least part of an outer profile of the object within an image frame and to detect the location of the part;
   (c) on the basis of the location detected, to detect a particular area of the object which is located within the outer profile of the object as well as its location;
   (d) to calculate a window region which is greater in size than the particular area and less in size than the image frame and centered about the particular area;
   (e) to write at least one fresh frame of video signal into the memory means;
   (f) to read the video signal located within the window region from the memory means, to detect the particular area and the location thereof on the basis of the video signal which is read from the memory means, and to calculate a fresh window region which is centered about the location detected;
   (g) to repeat the steps (e) and (f) to detect any change in a given status of the particular area; and
   (h) to command the output means to feed an on/off command signal in response to a given change in the status,
   illumination control means for adjusting the brightness achieved by the illumination means, whrein the memory means includes halftone video signal memory means which stores halftone data and bi-level data, and wherein the video signal processing means writes halftone data which is obtained by an A/D conversion of the video signal into the halftone video signal memory means, determines the brightness of an object based on the halftone data which is written into and to provide a command to increase or decrease the brightness level to the illumination control means when the brightness level is low or high, respectively, thus establishing the brightness level of an illumination lamp, writes the halftone data which is obtained by an A/D conversion of the video signal which is obtained at the established brightness level into the halftone video signal memory means and then reads the halftone data written into the memory means therefrom and convert it into bi-level data which is then written into the bi-level video signal signal memory means during the step (a), the video signal processing means reading the bi-level data from the bi-level video signal memory means during the step (b),
   the video signal processing means writing halftine data which is obtained by an A/D conversion of fresh video data into the halftone video signal memory means, reads the halftone data from the memory means and converts is into bi-level data which is then written into the bi-level video signal memory means during the step (e), the video signal processing means reading the bi-level data from the bi-level video signal memory means during the step (f).

2. An apparatus according to claim 1 in which the change in a given status represents a change in the location of the particular area.

3. An apparatus according to claim 1 in which the video signal processing means examines an on/off condition of an electrical device which prevails when a change in a given status is detected, and causes the output means to provide an on or off command signal when the electical device is on or off, respectively. an 4. An apparatus for commanding an energization of electrical device comprising:
   illumination means for illuminating an object;
   camera means for converting an optical image of the object into a video signal;
   memory means for storing at least one frame of the video signal;
   output means for delivering an on/off command signal to an electrical device;
   video signal processing means which operates
   (a) to write the video signal into the memory means;
   (b) to read the video signal form the memory means and to detect at least part of an outer profile of the object within an image frame and to detect the loaction of the part;
   (c) on the basis of the location detected, to detect a particular area of the object which is located within the outer profile of the object as well as its location;
   (d) to calculate a window region which is greater in size than the particular area and less in size than the image frame and centered about the particular area;
   (e) to write at least one fresh frame of video signal into the memory means;
   (f) to read the video signal located within the window region from the memory means, to detect the particular area and the location thereof on the basis of the video signal which is read from the memory means, and to calculate a fresh window region which is centered about the location detected;

(g) to repeat the steps (e) and (f) to detect any change in a given status of the particular area; and (h) to command the output means to feed an on/off command signal in response to a given change in the status, in which the change in a given status represents a change in the configuration of the particular area.

5. An apparatus according to claim 4 in which the video signal processing means examines an on/off condition of an electrical device which prevails when a change in a given status is detected, and causes the output means to provide an on or off command signal when the electrical device is on or off, respectively.

6. An apparatus for commanding an energization of an electrical device comprising:

illumination means for illuminating an object;

camera means for converting an optical image of the object into a video signal;

memory means for storing at least one frame of the video signal;

output means for delivering an on/off command signal to an electrical device;

video signal processing means which operates (a) to write the video signal into the memory means;

(b) to read the video signal from the memory means and to detect at least part of an outer profile of the object within an image frame and to detect the location of the part;

(c) on the basis of the location detected, to detect a particular area of the object which is located within the outer profile of the object as well as its location;

(d) to calculate a window region which is greater in size than the particular area and less in size than the image frame and centered about the particular area;

(e) to write at least one fresh frame of video signal into the memory means;

(f) to read the video signal located within the window region from the memory means, to detect the particular area and the location thereof on the basis of the video signal which is read from the memory means, and to calculate a fresh window region which is centered about the location detected;

(g) to repeat the steps (e) and (f) to detect any change in a given status of the particular area; and (h) to command the output means to feed an on/off command signal in response to a given change in the status, wherein the camera means comprises a television camera disposed in front of a driver's seat within an automobile for taking a picture of the face of a driver who is seated upon the driver's seat and looking forward of the automobile, the particular area being at least one pupil.

7. An apparatus according to claim 6 in which the change in a given status represents a change in the location of the particular area.

8. An apparatus according to claim 6 in which the video signal processing means examines an on/off condition of an electrical device which prevails when a change in a given status is detected, and causes the output means to provide an on or off command signal when the electrical device is on or off, respectively.

9. An apparatus for commanding an energization of an electrical device comprising:

illumination means for illuminating an object;

camera means for converting an optical image of the object into a video signal;

memory means for storing at least one frame of the video signal;

output means for delivering an on/off command signal to an electrical device;

video signal processing means which operates (a) to write the video signal into the memory means;

(b) to read the video signal from the memory means and to detect at least part of an outer profile of the object within an image frame and to detect the location of the part;

(c) on the basis of the location detected, to detect a particular area of the object which is located within the outer profile of the object as well as its location;

(d) to calculate a window region which is greater in size than the particular area and less in size than the image frame and centered about the particular area;

(e) to write at least one fresh frame of video signal into the memory means;

(f) to read the video signal located within the window region from the memory means, to detect the particular area and the location thereof on the basis of the video signal which is read from the memory means, and to calculate a fresh window region which is centered about the location detected;

(g) to repeat the steps (e) and (f) to detect any change in a given status of the particular area; and (h) to command the output means to feed an on/off command signal in response to a given change in the status, wherein the camera means comprises a television camera disposed in front of a driver's seat within an automobile for taking a picture of the face of a driver who is seated upon the driver,s seat and looking forward of the automobile, the particular area being a mouth of the driver.

10. An apparatus according to claim 9 in which the video signal processing means examines an on/off condition of an electrical device which prevails when a change in a given status is detected, and causes the output means to provide an on or off command signal when the electrical device is on or off, respectively.

11. An apparatus for commanding an energization of an electical device comprising:

illumination means for illuminating an object;

camera means for converting an optical image of the object into a video signal;

memory means for storing at least one frame of the video signal;

output means for delivering an on/off command signal to an electrical device;

video signal processing means which operates (a) to write the video signal into the memory means;

(b) to read the video signal from the memory means and to detect at least part of an outer profile of the object within an image frame and to detect the location of the part;

(c) on the basis of the location detected, to detect a particular area of the object which is located within the outer profile of the object as well as its location;

(d) to calculate a window region which is greater in size than the particular area and less in size than the image frame and centered about the particular area;

(e) to write at least one fresh frame of video signal into the memory means;

(f) to read the video signal located within the window region from the memory means, to detect the particular area and the location thereof on the basis of the video signal which is read from the memory means, and to calculate a fresh window region which is centered about the location detected;

(g) to repeat the steps (e) and (f) to detect any change in a given status of the particular area; and (h) to command the output means to feed an on/off command signal in response to a given change in the status, wherein the camera means comprises a television camera disposed in front of a driver's seat within an automobile for taking a picture of the face of a driver who is seated upon the driver,s seat and looking forward of the automobile, the particular area being at least one pupil and mouth of the driver.

12. An apparatus according to claim 11 in which the change in a given status represents a change in the location of the pupil and in which the change in a given status represents a change in the configuration of the mouth.

13. An apparatus according to claim 11 in which the video signal processing means examines an on/off condition of an electrical device which prevails when a change in a given status is detected, and causes the output means to provide an on or off command signal when the electrical device is on or off, respectively.

* * * * *